United States Patent
Leddy et al.

(10) Patent No.: US 10,774,430 B2
(45) Date of Patent: Sep. 15, 2020

(54) CARBON DIOXIDE REDUCTION AND CARBON COMPOUND ELECTROCHEMISTRY IN THE PRESENCE OF LANTHANIDES

(71) Applicants: Johna Leddy, Iowa City, IA (US); Nadeesha P. W. Rathuwadu, Iowa City, IA (US)

(72) Inventors: Johna Leddy, Iowa City, IA (US); Nadeesha P. W. Rathuwadu, Iowa City, IA (US)

( * ) Notice: Subject to any disclaimer, the term of this patent is extended or adjusted under 35 U.S.C. 154(b) by 137 days.

(21) Appl. No.: 15/724,481

(22) Filed: Oct. 4, 2017

(65) Prior Publication Data
US 2018/0094355 A1  Apr. 5, 2018

Related U.S. Application Data

(60) Provisional application No. 62/403,992, filed on Oct. 4, 2016.

(51) Int. Cl.
*C25B 3/04* (2006.01)
*H01M 8/1016* (2016.01)
(Continued)

(52) U.S. Cl.
CPC ............ *C25B 3/04* (2013.01); *C25B 1/00* (2013.01); *C25B 3/00* (2013.01); *C25B 9/06* (2013.01);
(Continued)

(58) Field of Classification Search
CPC ...................................................... C25B 3/04
(Continued)

(56) References Cited

U.S. PATENT DOCUMENTS 4,101,395 A * 7/1978 Motani ............... C25B 9/08
204/252
4,647,349 A * 3/1987 Kreh .................. C07C 45/30
205/447
(Continued)

FOREIGN PATENT DOCUMENTS

WO   WO-2012137344 A1 * 10/2012 ............. C25B 15/02
WO   WO 2015/175476        11/2015

OTHER PUBLICATIONS

Karagiannakis et al., "Hydrogenation of Carbon Dioxide in a Proton Conducting Cell Reactor," Ionics (2002), vol. 8, pp. 123-127. (Year: 2002).*

(Continued)

*Primary Examiner* — Edna Wong
(74) *Attorney, Agent, or Firm* — The Marbury Law Group, PLLC

(57) ABSTRACT

Electrochemically reacting C-1 compounds including carbon dioxide, formic acid, formaldehyde, methanol, carbon monoxide in the presence of at least one lanthanide and/or at least one actinide. Reducing carbon dioxide or reacting C-1 compounds such as HCOOH (formic acid), HCHO (formaldehyde), $CH_3OH$ (methanol), or CO (carbon monoxide) with use of an electrochemical device, wherein the device comprises at least one cathode, and at least one anode, and at least one electrolyte between the cathode and the anode, wherein the electrolyte comprises at least one lanthanide and/or actinide compound. The electrode can be modified with a film such as an ionically conducting or ionically permeable film, optionally comprising a magnetic material. Polar organic solvent such as acetonitrile can be used. Electrocatalysis and/or reaction mediation is observed. Devices can be adapted to carry out the methods. The device (Continued)

can be part of a fuel cell, a battery, an electrolyzer, or an electrosynthetic device.

18 Claims, 18 Drawing Sheets

(51) Int. Cl.

| | |
|---|---|
| C25B 3/00 | (2006.01) |
| C25B 1/00 | (2006.01) |
| C25B 9/08 | (2006.01) |
| H01M 8/18 | (2006.01) |
| C25B 9/06 | (2006.01) |

(52) U.S. Cl.
CPC ............ *C25B 9/08* (2013.01); *H01M 8/1016* (2013.01); *H01M 8/188* (2013.01)

(58) Field of Classification Search
USPC .................... 205/413, 440, 450, 462, 555
See application file for complete search history.

(56) References Cited

U.S. PATENT DOCUMENTS

| | | | | |
|---|---|---|---|---|
| 4,701,245 | A * | 10/1987 | Kreh | ........................ C07C 45/28 |
| | | | | 205/447 |
| 2002/0004106 | A1 | 1/2002 | Leddy et al. | |
| 2002/0012821 | A1 | 1/2002 | Leddy et al. | |
| 2003/0232223 | A1 | 12/2003 | Leddy et al. | |
| 2004/0026253 | A1 | 2/2004 | Leddy et al. | |
| 2004/0137283 | A1 | 7/2004 | Leddy et al. | |
| 2004/0234767 | A1 | 11/2004 | Leddy et al. | |
| 2005/0084741 | A1 | 4/2005 | Leddy et al. | |
| 2005/0213187 | A1 | 9/2005 | Leddy et al. | |
| 2005/0214169 | A1 | 9/2005 | Leddy et al. | |
| 2006/0099475 | A1 * | 5/2006 | Watanabe | ........... H01M 8/1023 |
| | | | | 429/465 |
| 2006/0130557 | A1 | 6/2006 | Leddy et al. | |
| 2007/0009771 | A1 | 1/2007 | Leddy et al. | |
| 2007/0056849 | A1 | 3/2007 | Leddy et al. | |
| 2008/0295573 | A1 | 12/2008 | Leddy et al. | |
| 2010/0092779 | A1 | 4/2010 | Leddy et al. | |
| 2010/0173068 | A1 | 7/2010 | Leddy et al. | |
| 2010/0196800 | A1 * | 8/2010 | Markoski | ............. H01M 8/1011 |
| | | | | 429/523 |
| 2010/0266907 | A1 | 10/2010 | Yazami | |
| 2010/0291415 | A1 | 11/2010 | Leddy et al. | |
| 2011/0214997 | A1 | 9/2011 | Leddy et al. | |
| 2011/0237830 | A1 * | 9/2011 | Masel | ................. B01J 31/0278 |
| | | | | 562/550 |
| 2012/0088148 | A1 | 4/2012 | Leddy et al. | |
| 2012/0308903 | A1 | 12/2012 | Masel | |
| 2013/0228470 | A1 | 9/2013 | Chen | |
| 2013/0308248 | A1 | 11/2013 | Leddy et al. | |
| 2014/0378016 | A1 | 12/2014 | Leddy et al. | |
| 2015/0322581 | A1 | 11/2015 | Leddy et al. | |
| 2016/0194766 | A1 | 7/2016 | Eastman et al. | |

OTHER PUBLICATIONS

Xie et al., "Electrochemical Reduction of CO2 in a Proton Conducting Solid Oxide Electrolyser," J. Mater. Chem. (2011), vol. 21, pp. 195-198. (Year: 2011).*

Bard et al., Electrochemical Methods, Fundamentals, and Applications, 2nd Ed.; John Wiley, 2001.

Binnemans, "Lanthanides and Actinides in Ionic Liquids", Chem. Rev., 2007, 107(6), 2592-2614.

Cotton, "Lanthanide and Actinide Chemistry", vol. 27 (2006) John Wiley & Sons; Uppingham School, Uppingham, Rutland, UK; Retrieved from: http://www.wiley.com/WileyCDA/WileyTitle/productCd-0470010053.html.

Jitaru, M. "Electrochemical Carbon Dioxide Reduction—Fundamental and Applied Topics (Review)", Journal of the University of Chemical Technology and Metallurgy 2007, 42, 333-344 (convert carbon dioxide to useful products).

Jitaru, et al. "Electrochemical reduction of carbon dioxide on ¯ at metallic cathodes", Journal of Applied Electrochemistry 1997, 27, 876-889.

Knoche, "Density Gradient Films, Lanthanide Electrochemistry, and Magnetic Field Effects on Hydrogen Evolution, Oxygen Reduction, and Lanthanide Electrochemistry", (2015) Ph. D. Thesis.

Parrish et al., "Electrochemical generation of low-valent lanthanides"; Tetrahedron Letters, 42 (2001), 7767-7770.

Rathuwadu, "Magnetic Field Effects on Electrochemical Systems, Lanthanide Electrochemistry, Thin Layer Sonoelectrochemistry and Models for Polymer Film Characterization" (2017), Ph. D. Thesis.

Tomita et al., "Electrochemical Reduction of Carbon Dioxide at a Platinum Electrode in Acetonitrile-Water Mixtures", Journal of the Electrochemical Society 2000, 147, 4164-4167.

Toyoshima et al., "Development of an electrochemistry apparatus for the heaviest elements", Radiochem. Acta, 96, 323-326 (2008).

Vogel's Practical Organic Chemistry (5th Ed.) 1989 (Table of Contents only).

Yamagata et al., "Electrochemical Behavior of Samarium, Europium, and Ytterbium in Hydrophobic Room-Temperature Molten Salt Systems", J. Electrochem. Soc., 153(1), E5-E9 (2006).

Yuan et al., "Mercury-Free Detection of Europium (III) at a Glassy Carbon Electrode Modifies with Carbon Nanotubes by Adsorptive Stripping Voltammetry", Anal. Letters, 39, 373-385 (2006).

Leddy et al., U.S. Appl. No. 62/403,992; filed Oct. 4, 2016.

International search report and written opinion received in connection with international application No. pct/us2017/055029; dated Jan. 3, 2018.

* cited by examiner

US 10,774,430 B2

CARBON DIOXIDE REDUCTION AND CARBON COMPOUND ELECTROCHEMISTRY IN THE PRESENCE OF LANTHANIDES

FEDERAL FUNDING STATEMENT

This invention was made with government support under grant CHE-1309366 awarded by the National Science Foundation. The government has certain rights in this invention.

INTRODUCTION

Currently, renewable and alternative energy sources are attracting enormous attention as a replacement for fossil fuels. Limited availability, high cost, and environment pollution caused by fossil fuels are the motivations to investigate renewable and alternative energy sources. Numerous sources are currently investigated and used as replacements for fossil fuels, and nuclear energy is one of the sources. Nuclear energy is particularly attractive because the energy density is extremely high as compared to fossil fuels and other renewable and alternative energy sources. This is the major advantage of using nuclear energy. However, the disadvantage of nuclear energy is the production of nuclear waste which contains radioactive and non-radioactive isotopes. Lanthanides are produced by nuclear reactions and are non-radioactive isotopes. If these are separated from nuclear waste, the amount of nuclear waste can be reduced, and valuable rare earth metals can be recycled to be used in lasers, magnets, medical imaging, and catalysis. In order to achieve this, however, it is important to detect and separate lanthanides efficiently.

Existing methods of lanthanide detection and separation typically involve solvent extraction, molten salts, and/or ionic liquids. These methods can be expensive, complex, repetitive, and time consuming. Lanthanides are difficult to detect and separate because they have very similar properties such as masses, ionic radii, standard potentials, oxidation states, ligand binding, and solubilities. Therefore, these lead to inefficient lanthanide discrimination and separation. Electrochemical analysis and separation of lanthanides is limited not only due to similar standard potentials, but also these standard potentials fall outside the common electrolyte solvent potential windows. If an electrochemical method can be developed for lanthanide separation and characterization, it should be inexpensive, user-friendly, quick and efficient. However, attempts to develop electrochemical methodologies for lanthanides and actinides in simple aprotic electrochemical solvents have been made with negative or limited results.

Parrish et al., *Tetrahedron Letters*, 42 (2001), 7767-7770 describes an experiment in which Sm or Yb triflate compounds are reported reduced in acetonitrile at an unmodified electrode. However, in reproducing these experiments, it was found that the waves identified as lanthanide triflates disappeared on sparging with nitrogen. The reported results could not be reproduced, and there is no description of modifying the electrode.

Yuan et al., *Anal. Letters*, 39, 373-385 (2006) teaches about detection of Europium(III) with use of differential pulse stripping voltammetry in water with Nafion modified electrodes further modified with multi-wall carbon nanotubes for more sensitive detection. However, standard potentials for Europium (III) differ significantly (by several hundred millivolts) from standard potentials for the other lanthanides.

Toyoshima et al., *Radiochem. Acta*, 96, 323-326 (2008) describes a flow electrolytic cell in water.

Leddy et al. invented a bench-top electrochemical method to perform lanthanide electrochemistry which is inexpensive, user-friendly, quick, and efficient compared to the existing methods (see WO 2015/175476). Lanthanide electrochemistry was enabled, for example, in acetonitrile at a Nafion modified platinum electrode in the presence of triflate ligands. Also, electrocatalysis and mediation of the oxygen reduction reaction (ORR) at the electrodes in the presence of the lanthanide complexes was noted.

Carbon dioxide reduction is important in carbon sequestration and creating value added products such as carbon monoxide, formic acid, formaldehyde, and methanol (collectively, C-1 compounds), all of which conversely can be used as fuels in electrochemical reactors, provided adequate electrocatalysts and mediators can be identified. Among the approaches to enhance carbon compound electrochemistry, including C-1 electrochemistry, are introduction of precious metals as electrodes and electrocatalysts, enhanced electrode area, finely divided catalysts, metallic alloys and catalysts, air bleeds, structures with complex multiphase contacts, and temperatures and pressures more extreme then available in organic solvents on the bench top. However, significant challenges exist with these approaches.

Desilvestro et al., reported oxalate formation from $CO_2$ reduction at a Pt electrode in tetraethylammonium fluoride [Desilvestro, J.; Pons, S. *Journal of Electroanalytical Chemistry* 1989, 267, 207-220]. However, the same results were later obtained and interpreted by Christensen et al. as carbonate species solvated by water or forming ion pairs with tetrabutylammonium cations [Christensen, P. A.; Hamnett, A.; Muir, A. V. G.; Freeman, N. A. *Journal of Electroanalytical Chemistry* 1990, 288, 197-215]. Vassiliev et al. performed $CO_2$ reduction at a Pt electrode in acetonitrile and reported production of CO and $CO_3^{2-}$. Hori et al. reported $CO_2$ reduction at a Pt electrode in tetraethylammonium perchlorate in acetonitrile mainly producing oxalic acid and, with increased water concentration, mainly formic acid was produced [Tomita, Y.; Teruya, S.; Koga, O.; Hori, Y. *Journal of the Electrochemical Society* 2000, 147, 4164-4167.]

Electrochemical reduction of $CO_2$ in aqueous solution has several disadvantages, particularly with respect to efficiency. $CO_2$ is less soluble in aqueous medium and in some of the nonaqueous solvents. Pt electrodes can be inert for the reaction, and competitive reactions like hydrogen evolution reaction (HER) can dominate under aqueous conditions, especially at many electrodes considered good electrocatalysts such as platinum. Application of a bench top electrochemical method in acetonitrile can overcome these disadvantages. In the polar, organic solvent, acetonitrile, $CO_2$ has a high solubility, about tenfold higher compared to water. Nafion has high $CO_2$ permeability and solubility, so that with high solubility in acetonitrile, more $CO_2$ can be accumulated near the electrode surface [Mukaddam, M.; Litwiller, E.; Pinnau, I. *Macromolecules* 2016, 49, 280-286]. Competitive reactions like HER are suppressed under nonaqueous conditions.

Other references include Fierro, *Catalysis Letters*, 22 (1993), 67-91; Yang, *J. Cleaner Production*, 103 (2015), 784-792; Prieto, *ChemSusChem*, 2017, 10, 1056-1070; Mesters, *Annu. Rev. Chem. Biomol. Eng.*, 2016, 7, 223-228; Shen, *Top Catal.* (2011) 54: 482-489; and West et al., *Coordination Chemistry Reviews*, 255 (2011) 881-898.

SUMMARY

The presently claimed inventions were discovered as part of an effort to investigate the possibility of using the method and the presence of lanthanides to mediate $CO_2$ reduction and related C-1 compound reactions. With $CO_2$ being the most contributed greenhouse gas to global warming and with carbon dioxide being the final oxidation product in the C-1 oxidation scheme, it is critical to invent methods to convert $CO_2$ to useful value added compounds and regenerate reduced C-1 species. Electrochemical reduction of $CO_2$ has gained significant attention as one of the main ways to achieve the objective. See, for example, "Electrochemical Reduction of Carbon Dioxide . . . ", Tomita et al., *J. Electrochem. Soc.,* 147(11), 4164-4167 (2000). Electrochemical reduction of $CO_2$ in aqueous solution, however, has several disadvantages. $CO_2$ is less soluble, Pt electrodes can be inert for the reaction or passivated by reaction products and byproducts, and competitive reactions like hydrogen evolution reaction (HER) can be dominant under aqueous conditions. The usage of newly invented bench-top electrochemical method can overcome above mentioned disadvantages. In acetonitrile, for example, $CO_2$ has a very high solubility, Nafion has high gas permeability and solubility, Pt electrodes are not inert for the reaction, and no major competitive reactions take place under non aqueous conditions such as HER. Moreover, the possibility of lanthanides to mediate electrochemical reduction of $CO_2$ by behaving as spin mediators or metal catalysts was considered.

An electrochemical method has been developed to allow voltammetric interrogation of lanthanides in common organic, electrochemical solvents. Lanthanide electrochemistry was enabled in, for example, acetonitrile at, for example, an ion exchange polymer (Nafion) modified platinum electrode with, for example, triflate (trifluoromethane sulfonate) ligands. Under these conditions, formal potentials of the lanthanides were shifted into the potential window of acetonitrile, and lanthanide voltammetry was enabled. With enabled lanthanide voltammetry, electrochemical mediation is enabled and electrocatalysis can be facilitated.

Embodiments described herein include devices, apparatuses, systems, and methods of making and using the same.

One aspect, for example, provides for a method comprising reducing carbon dioxide or reacting HCOOH, HCHO, $CH_3OH$, and/or CO with use of an electrochemical device, wherein the device comprises at least one cathode, and at least one anode, and at least one electrolyte between the cathode and the anode, wherein the electrolyte comprises at least one lanthanide and/or actinide.

In one embodiment, the method comprises reduction of carbon dioxide. In one embodiment, the method comprises reaction of HCOOH, HCHO, $CH_3OH$, and/or CO. In one embodiment, the method comprises reaction of HCOOH. In one embodiment, the method comprises reaction of HCHO. In one embodiment, the method comprises reaction of $CH_3OH$. In one embodiment, the method comprises reaction of CO.

In one embodiment, the electrolyte comprises at least one lanthanide. In one embodiment, the electrolyte comprises at least one actinide. In one embodiment, the electrolyte comprises at least one lanthanide and at least one actinide.

In one embodiment, the at least one lanthanide and/or actinide comprises a fluorosulfonate. In one embodiment, the at least one lanthanide and/or actinide comprises trifluoromethanesulfonate.

In one embodiment, the cathode and/or anode is modified with a polymeric film. In one embodiment, the cathode and/or anode is modified with an ionically conducting or ionically permeable film, optionally comprising a magnetic material. In one embodiment, the cathode and anode are not magnetically modified. In one embodiment, the cathode and/or anode is magnetically modified. In one embodiment, the cathode and/or anode is magnetically modified with a film comprising magnetic particles. In one embodiment, the cathode and/or anode is magnetically modified with a film comprising magnetic particles and a fluorosulfonic acid polymer.

In one embodiment, the electrolyte is dissolved in a solvent system comprising as primary solvent a solvent which has a dielectric constant of at least 5. In one embodiment, the electrolyte is dissolved in a solvent system comprising acetonitrile as primary solvent.

In one embodiment, the device is part of a fuel cell, a battery, an electrosynthetic device, or an electrolyzer.

Another aspect provides for a method comprising electrochemically reacting carbon dioxide, formic acid, formaldehyde, methanol, carbon monoxide, and/or any other carbon compound in the presence of at least one lanthanide and/or at least one actinide. In one embodiment, the carbon compound is a C-1 carbon compound. In one embodiment, the at least one lanthanide and/or at least one actinide is part of a film or is part of a solution. In one embodiment, the at least one lanthanide and/or actinide is part of a solution and dissolved in a solvent system comprising as primary solvent a solvent which has a dielectric constant of at least 5. The primary solvent can be acetonitrile. In one embodiment, the electrochemically reacting is carried out with a cathode and/or anode which is modified with a polymeric film. The polymeric film can be an ionically conducting or ionically permeable film.

Another aspect provides for a device which comprises at least one cathode, and at least one anode, and at least one electrolyte between the cathode and the anode, wherein the electrolyte comprises at least one lanthanide and/or actinide, wherein the device is adapted for electrochemically reducing carbon dioxide or reacting HCOOH, HCHO, $CH_3OH$, CO, and/or any other carbon compound. In one embodiment, the carbon compound is a C-1 carbon compound. In one embodiment, the device is a fuel cell, a battery, an electrosynthetic device, or an electrolyzer.

In one embodiment, the lanthanide and/or actinide acts as an electrocatalyst and/or mediates the C-1 compound reaction. In one embodiment, the lanthanide compound serves to increase the electrode area by, for example, deposition of elemental metal (a lanthanide or actinide metal) in microscopic or nanoscopic form.

In general, the lanthanide embodiment is preferred over the actinide embodiment, and in a preferred embodiment, the actinides are not present and/or are excluded.

For the carbon dioxide reduction embodiments, at least one or more of the following advantages can apply: no major competitive side reactions; high carbon dioxide solubility in acetonitrile; high carbon dioxide permeability and solubility of Nafion; and possibility of lanthanide to participate as a metal catalyst and/or mediator; and avoiding or decreasing passivation by reduction products such as CO.

The advantages of electrochemical methods for carbon compound chemistry, including C-1 chemistry, are numerous. These include, for example, generation of value added products, carbon sequestration, increased efficiency of liquid organic fuels in electrochemical devices for generation and storage, and opportunities for closed system energy generation devices.

In sum, electrochemical methods find applications in electrosynthesis of value added materials, electrochemical energy generation storage, and electrocatalysis and mediation. For organic species, electrochemistry of small organic molecules is critical in overcoming of carbon dioxide accumulation, catalyst poisoning by carbon monoxide, mitigation of carbonate deposits in reactors, effective use of liquid fuels such as methanol, formaldehyde, and formic acid. These are the C-1 species, molecules containing a single carbon. Species containing two or more carbons present analogous challenges to electrochemical modification. Effective C-1 electrochemistry can lead to value added products.

DETAILED DESCRIPTION

Figure 1:
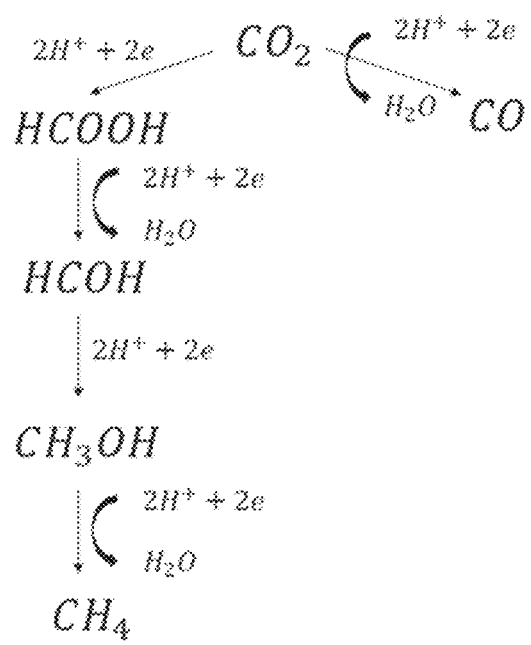
FIG. 1. Flow diagram of sequential electron transfer steps in C-1 compound electrochemistry.

U.S. priority provisional application Ser. No. 62/403,992 filed Oct. 4, 2016 is hereby incorporated by reference in its entirety including all working examples, Appendix A, and claims.

Prior US Patent Publication 2015/0322581 (WO 2015/175476) is hereby incorporated by reference in its entirety including the electrochemical systems, devices, methods, and components thereof.

The following PhD thesis is hereby incorporated by reference in its entirety, with particular focus on Chapter 4: Nadeesha P. W. Rathuwadu,©2017, "Magnetic Field Effects on Electrochemical Systems, Lanthanide Electrochemistry, Thin Layer Sonoelectrochemistry and Models for Polymer Film Characterization." This incorporation by reference includes the working examples, figures, literature citations, materials and methods, and results and discussion.

The following PhD thesis is also hereby incorporated by reference in its entirety, with particular focus on Chapters 4, 5, and 6: Krysti L. Knoche, ©2015, "Density Gradient Films, Lanthanide Electrochemistry, and Magnetic Field Effects on Hydrogen Evolution, Oxygen Reduction, and Lanthanide Electrochemistry." This incorporation by reference includes the working examples, figures, literature citations, materials and methods, and results and discussion.

Also, background references include, for example, Cotton, S., *Lanthanide and Actinide Chemistry*, Wiley: 2007; Vol. 2; and Bard, A. J.; Faulkner, L. R., *Electrochemical Methods, Fundamentals, and Applications*, $2^{nd}$ Ed.; John Wiley, 2001. See also, Jitaru et al., *Reviews In Applied Electrochemistry, No 45, Journal Of Applied Electrochemistry* 27 (1997) 875-889.

Electrochemically Oxidizing and/or Reducing

Electrochemical reaction steps including oxidation and/or reductions are well-known in the art and can be evaluated by cyclic voltammetry methods and with electrochemical instrumentation.

In one embodiment, the electrochemical oxidation and/or reduction is carried out under the influence of a magnetic field which favorably enhances the reaction. In another embodiment, the electrochemical oxidation and/or reduction is not carried out under the influence of a magnetic field which may or may not favorably enhance the reaction.

Lanthanides and/or Actinides

Herein, lanthanides and/or actinides are subjected to electrochemical oxidation and/or reduction. For use herein, a lanthanide (or a lanthanide compound or complex) or an actinide (or an actinide compound or complex) broadly includes various compounds, forms, elements, metals, alloys, ingots, mixtures, complexes, and salts of the lanthanide or actinide metal, irrespective of the oxidation state. For example, $Ln(OTf)_3$ is a lanthanide or a lanthanide compound. For lanthanide and actinide descriptions, see, for example, Cotton and Wilkinson, *Advanced Inorganic Chemistry, A Comprehensive Text*, $4^{th}$ Ed., Chapters 23-24. The lanthanide and/or actinide can exist as a complex or compound having one or more ligands, or anions, associated with it. Anions can have one or more negative charges. Ligands can have one, two, or more coordinating atoms such as oxygen or nitrogen. Chelating anions and ligands can be used. Cations can also be present on the ligand. One or more neutral ligands can be used.

The lanthanide metals which can be used are La, Ce, Pr, Nd, Pm, Sm, Eu, Gd, Tb, Dy, Ho, Er, Tm, Yb, and Lu. In one embodiment, the group of lanthanide metals is selected from La, Pr, Nd, Pm, Sm, Gd, Tb, Dy, Ho, Er, Tm, Yb, and Lu. In one embodiment, the group of lanthanide metals is selected from Yb, Sm, Dy, Gd, and Pr. Mixtures of different lanthanide compounds and lanthanide metals can be used. In one embodiment, the lanthanide is not cerium, and/or is not europium.

The actinide metals are Ac, Th, Pa, U, Np, Pu, Am, Cm, Bk, Cf, Es, Fm, Md, No, and Lr. Mixtures of different actinides can be used. Mixtures of lanthanide and actinide compounds can be used.

The oxidation state of the metal in the metal compound subjected to the methods herein is not particularly limited but can be, for example, 3+, 2+, 4+, 1+, or 0.

Hence, in one preferred embodiment, the step of electrochemically oxidizing and/or reducing is carried out on a lanthanide but not an actinide.

In another preferred embodiment, the step of electrochemically oxidizing and/or reducing is carried out on a mixture of lanthanide and actinide. The purpose can be one of separation, mediation, catalysis, or any other purpose described here, for example.

In another preferred embodiment, the step of electrochemically oxidizing and/or reducing is carried out on a mixture of at least two different lanthanides. Again, the purpose can be one of separation, mediation, catalysis, or any other purpose described herein, for example.

In more preferred embodiments, the lanthanide, irrespective of oxidation state, can be Pr, Nd, Pm, Sm, Gd, Tb, Dy, Ho, Er, Tm, Yb, or Lu. Alternatively, the lanthanide, irrespective of oxidation state, can be Pr, Sm, Gd, Dy, or Yb.

In some embodiments, yttrium and/or scandium can also be present in the oxidation and/or reduction step. Other elements, metals, and compounds can be also present depending on the need. For example, crude materials may be subjected to the electrochemical reaction which has many components besides the lanthanide and/or actinide. Also, for example, catalysts and mediators that exploit a lanthanide and a transition metal may be appropriately used Electrode Comprising Film Including Ionically Conducting or Ionically Permeable Film Electrodes which are relatively easy to make and use can be used herein. In contrast, difficult electrodes such as mercury electrodes can be avoided. The electrode can comprise an electronically conductive substrate which has a surface film or coating. The film or coating can be selected to provide for mechanical robustness and good adherence to the electrode under the reaction conditions, including exposure to solvent and possible swelling. The surface film or coating can be, for example, a polymer film comprising an ion conductive polymer, an ion permeable polymer, an electron conducting polymer, or a neutral polymer. The film can comprise an ionically conductive or ionically permeable material. The film and/or the material can comprise at least one polymer including at least one ionically conductive polymer. The polymer can be, for example, a polyelectrolyte including an anionic polymer bearing negative charge or a cationic polymer bearing positive charge. Uncrosslinked or crosslinked forms of polymers can be used.

The electrode substrate is not particularly limited but can be, for example, platinum, glassy carbon, gold, or boron doped diamond (BDD). Such electrodes, which are electronically conductive, are well known in the electrochemical arts.

In one embodiment, the film comprises at least one polymer, which can be, for example, an ionically conductive polymer, which can be, for example, a fluorosulfonate polymer. Other examples include polymers which are polyethers; polymers having amine including quaternary amine functional groups; polymers which are fluorinated, perfluorinated, and not fluorinated sulfonates; polymers which are fluorinated, perfluorinated, and not fluorinated carbonates; conjugated polymers; and mixtures of polymers.

At least one polymer film can be disposed on the substrate comprising at least one ionically conductive polymer such as a fluorosulfonate polymer. In an anionic polymer, such as a fluorosulfonic acid polymer, the proton or cation can be associated with the anion and the cation can be varied.

The film thickness is not particularly limited but can be, for example, 10 nm to 50 microns, or 500 nm to 50 microns, or one micron to 10 microns. The polymer can be supported as needed. Fluorosulfonate polymers are known in the art. NAFION® is a polymeric form of a sulfonated tetrafluoroethylene based fluorocarbon and can be used in the surface coating of polymeric material. Similar fluorosulfonate polymers can be used. The density of sulfonate groups and the molecular and equivalent weights can be adapted to the need. Methods known in the art for film formation can be used.

In one embodiment, the film further comprises at least one conductive filler such as, for example, carbon black, or various nanowire or nanotube structures. In another embodiment, the film further comprises at least one conductive filler which is a nanotube or nanowire. In another embodiment, the film contains no conductive filler. Particles can be added to the film. Film swelling can be controlled.

In one embodiment, the film is not magnetically modified.

In another embodiment, the working electrode is magnetically modified as described hereinbelow, optionally by adapting the film to be magnetically modified. For example, the film can be magnetically modified including magnetically modified with use of magnetic particles in the film. In another embodiment, an external magnetic field can be applied to the electrode.

The electrode subject to modification can be a cathode and/or an anode based on the needs of the reaction.

Ligand

At least one ligand which is distinct from the ionically conducting or ionically permeable material or film is present as part of the lanthanide, the actinide, the electrolyte, or a combination thereof. The ligand facilitates the oxidizing and/or reducing of the lanthanide, actinide, or combination thereof. It may enhance solubility, for example. In one embodiment, for the source of the ligand, the ligand is part of the lanthanide and/or actinide. In another embodiment, for the source of the ligand, it is part of the electrolyte. In another embodiment, for the source of the ligand, the ligand is part of the lanthanide and/or actinide, and also it is part of the electrolyte. Once the lanthanide and/or actinide is mixed with the solvent system, and electrolyte, it may not be possible to tell where the source of the ligand was as exchange reactions can take place.

The ligand is not particularly limited but can be an anion, a neutral moiety, or even a cation or a moiety which comprises a cation. It can be an ion or a molecule. An anion or neutral form of the ligand is preferred. An anion is particularly preferred. The ligand can even be zwitterionic in form, having both a cation and an anion. The ligand can be one that is known to complex or be associated with a lanthanide and/or actinide including a chelating ligand or a ligand with multiple charges.

Examples of ligands include crown ethers, sulfonate or carbonate anions, EDTA, or conjugated molecules such as cyclooctatetrene, cyclopentadiene, or pentamethylcyclopentadiene.

In one embodiment, the ligand is a fluorosulfonate anion. In another embodiment, the ligand is a chelating anionic ligand. Examples of chelating ligands include, for example, thymolphthalexon, 2-thenoyltrifluoroacetone (TTA), triethylenetetraaminehexaacetic acid (TTHA), ethylenediaminetetraacetic acid (EDTA), and diethylenetriaminepentaacetic acid (DTPA). Fluorosulfonate anions are known in the art. For example, an aromatic ring can be functionalized with sulfonate and also fluorinated. An example is a fluorinated benzene sulfonate compound or a trifluoromethane sulfonate, i.e. "triflate." See for example Suzuki, Noble, and Koval, $Inorganic$ $Chemistry$, 1997, 36, 136-140 for a complexation, solubility, and ligand exchange study of copper triflate.

In one embodiment, the fluorosulfonate anion is part of the lanthanide or lanthanide compound. In a preferred embodiment, the fluorosulfonate anion is trifluoromethane sulfonate (triflate).

In another example, the ligand is chemically modified so as to shift the formal potential for reduction of the lanthanide complex. Tuning of the formal potential for the lanthanide electrochemistry is desirable for example to establish the electrochemistry of the lanthanide within the solvent window. A second application where shifting the lanthanide formal potential is when the lanthanide mediator formal potential is positioned so as to increase the rate (catalyze/mediate) of reaction for a substrate. Shifts in lanthanide formal potential can increase the driving force for the reaction.

Chemically Similar

It is generally desired that the ligand, whether it be an anion or not, is chemically similar to or the same as a structure in the ionically conductive or ionically permeable film. The chemical similarity can be structural and/or functional. The ligand and the structure in the film, for example, might have similar interaction with the lanthanide and/or actinide. In one example of this chemical similarity, the ligand is a fluorosulfonate anion (e.g., triflate), and the ionically permeable or ionically conductive polymer is a fluorosulfonate polymer (e.g., NAFION). Other examples include situations such as a polyether and a crown ether; or a sulfonate polymer with a sulfonate anion; or a carbonate polymer with a carbonate anion; or a conjugated polymer with a conjugated anion or ligand. If the ligand is EDTA, the polymer can include acetate and/or tertiary amine functionality.

Solvents and Solvent System

Organic and/or nonaqueous solvents and solvent systems are generally known in the art. See, for example, K. Izutsu; $Electrochemistry$ $in$ $Nonaqueous$ $Solutions$, $2^{ND}$ Ed., 2009. See, in particular, pages 3-25.

The solvent system can be based on at least one solvent having a dielectric constant of at least about 3, or at least about 5, or at least about 8, or at least about 10, or at least about 20, or at least about 30.

Numerous organic solvents can be used within this teaching. For example, the dielectric constant for acetonitrile is 36.64; for methylene chloride 9.08; for DMSO 47; for propylene carbonate 65; for dimethyl formamide (DMF) 36.7; for ethylene carbonate 89.8 at 40° C. In contrast, for example, the dielectric constants for some hydrocarbon solvents are 2.28 for benzene, 1.92 for heptane, 1.89 for hexane, 2.38 for toluene.

Dielectric constants for common solvents provided in, for example, CRC ($87^{th}$ Ed.) or Vogel's $Practical$ $Organic$ $Chemistry$ ($5^{th}$ Ed.); or K. Izutsu, $Electrochemistry$ $in$ $Nonaqueous$ $Solutions$, $2^{ND}$ Ed., 2009.

In many cases, a primary solvent will be present which the majority solvent by weight, or is at least about 80 wt. %, or at least 95 wt. %, or at least 98 wt. % of the solvent system. Mixtures of solvents can be used.

In general, water is preferably excluded and not added, although minor portions of water might be present if desired in the context and the economic cost of water removal. Alternatively, water may be added as proton source or reactant in the electron transfer process. For example, the water of the solvent system can be less than about 25 wt. %; or less than about 15 wt. %; or less than about 5 wt. %; less than about 1 wt. %. Water can be present in some embodiments such as, for example, reaction of formaldehyde.

In one preferred embodiment, the solvent has a dielectric constant of at least 20. In another preferred embodiment, the solvent is acetonitrile.

In one preferred embodiment, the fluorosulfonate anion is trifluoromethane sulfonate (triflate) and the solvent is acetonitrile.

Acetonitrile provides a larger voltage window (roughly ±1800 mV) versus Ag|Ag oxide quasireference electrode (QRE) than water. With more stringent exclusion of water, voltage windows of greater than 4 V are accessible. Acetonitrile has excellent properties as an electrochemical solvent because acetonitrile has a dielectric constant, viscosity, and density similar to water.

Using the solvent systems described herein, ionic liquids and molten salts can be avoided in the electrochemical oxidation and/or reduction steps.

Electrochemical Conditions

Electrochemical methods known in the art can be used including cyclic voltammetry (CV). See, for example, Bard, Faulkner, *Electrochemical Methods, Fundamentals, and Applications,* $2^{nd}$ Ed., 2001.

The atmosphere can be an inert gas such as nitrogen or can be saturated with other gases such as carbon dioxide or other compounds, including C-1 compounds, as described herein.

The temperature can be, for example 15° C. to 40° C., or about 25° C. or varied between freezing and boiling of the liquid electrolyte.

Working, reference, and counter electrodes can be used as known in the art. Quasireference electrodes can be used. In some applications, a two electrode cell can be built and no reference or quasireference electrode is used. Cathodes and anodes are known in the art.

The electrolyte can be varied as known in the art. It can be, for example, a quaternary ammonium salt. The anion of the electrolyte can be a fluorosulfonate such as triflate, $CF_3SO_3^-$.

As known in the art, the concentration of the lanthanide and/or actinide compound can be varied.

As known in the art, the scan rate of the electrochemical methods can be varied.

As known in the art, a sacrificial anode that contains lanthanides or actinides, or a mixture thereof, can be used.

In one embodiment, the ionically conductive or ionically permeable polymer film is a free standing film disposed between two electrodes as a separator.

Other common electrochemical conditions can be varied as known in the art.

Use of Magnets and Magnetic Materials

As noted above, an embodiment for the electrochemical methods described hereinabove includes use of magnets and/or magnetic materials. For example, an aspect is a method comprising: electrochemically oxidizing and/or reducing at least one C-1 compound in the presence of at least one lanthanide, at least one actinide, or a combination thereof, irrespective of oxidation state, in a solvent system at at least one working electrode, wherein the solvent system comprises one or more organic solvents which have a dielectric constant of at least three and the water of the solvent system is less than about 25 wt. %; wherein the solvent system further comprises at least one electrolyte; wherein the at least one working electrode comprises at least one electronically conductive electrode substrate and at least one film thereon, such as an ionically conducting or ionically permeable film disposed on the substrate; wherein at least one ligand distinct from the ionically conducting or ionically permeable film is present as part of the lanthanide, the actinide, the electrolyte, or a combination thereof, wherein the ligand facilitates the oxidizing and/or reducing of the lanthanide, actinide, or combination thereof; wherein the ligand is chemically similar to a structure in the ionically conducting or ionically permeable film; and wherein the electrochemical oxidation and/or reduction is carried out under the influence of a magnetic field which favorably enhances the reaction.

Embodiments described hereinabove can also be used in the embodiments which use the magnetic field. For example, in one embodiment with use of the magnetic field, the step of electrochemically oxidizing and/or reducing is carried out on a lanthanide but not an actinide. In another embodiment, the step of electrochemically oxidizing and/or reducing is carried out on a mixture of lanthanide and actinide. In another embodiment, the step of electrochemically oxidizing and/or reducing is carried out on a mixture of at least two different lanthanides, or at least two different actinides. The lanthanide metals which can be used with the magnetic field are La, Ce, Pr, Nd, Pm, Sm, Eu, Gd, Tb, Dy, Ho, Er, Tm, Yb, and Lu. In one embodiment, the group of lanthanide metals is selected from La, Pr, Nd, Pm, Sm, Gd, Tb, Dy, Ho, Er, Tm, Yb, and Lu. In one embodiment, the lanthanide, irrespective of oxidation state, is Pr, Sm, Gd, Dy, or Yb. In some embodiments, the solvent has a dielectric constant of at least 5, or at least 8. In one embodiment, the ligand is a fluorosulfonate anion, and in another embodiment, the fluorosulfonate anion is part of the lanthanide compound.

Use of magnetic fields, materials, and particles has been described in the literature for various electrochemical applications. See, for example, US Patent Publications to Leddy et al. 2002/0004106; 2003/0232223; 2004/0026253; 2004/0137283; 2004/0234767; 2005/0084741; 2005/0213187; 2005/0214169; 2006/0130557; 2007/0009771; 2007/0056849; 2008/0295573; 2010/0092779; 2010/0173068; 2010/0291415; 2011/0214997; 2012/0088148; 2013/0308248; and 2014/0378016. In particular, US Publication to Leddy 2002/0012821 relates to lanthanides and actinides including separation devices and methods. In the '821 publication, lanthanides or actinides are separated en masse but not from each other, and the separation is based on mass transport, not based on electron transfer effects. One can use larger and stronger magnets for a particular application to achieve a desired effect.

The magnetic field can be applied by use of various embodiments. In one embodiment, the working electrode is magnetically modified. In one embodiment, the film disposed on the electronically conductive substrate is magnetically modified. In one embodiment, the lanthanides and/or actinides are subject to a magnetic field.

In one embodiment, the film is magnetically modified with use of magnetic particles. The particles can be, for example, nanoparticles or microparticles. The average diameter can be, for example, 10 nm to 50 microns, or 100 nm to 100 microns, or 500 nm to 25 microns. The amount and concentration of the magnetic particles in the film can be, for example, about 1 wt. % to about 20 wt. %, or about 2 wt. % to about 10 wt. %. This amount can be adapted for particular applications. Magnetic particles are generally known in the art as described, for example, in many of the Leddy patent documents cited herein. The film can comprise, as described above, a fluorosulfonate polymer, for example. A fluorosulfonate film can be used in conjunction with a fluorosulfonate ligand, so that the ligand has a similar chemical structure as found in the film.

Various structures of the particles can be present. For example, a core-shell structure can be present. The core can be the magnetic component, such as various forms of iron, whereas the shell can provide an inert or functional surface. The surface can be silanized, for example. One skilled in the art can select the magnetic materials.

Embodiments for Electrochemical Reactions of Carbon Dioxide and Carbon Compounds Additional embodiments for voltammetry of lanthanides on the bench top and evidence of electrocatalysis of reactions important in energy and environment are presented, including reactions of carbon dioxide and other carbon compounds including C-1 compounds. In some instances, carbon compounds with two or more compounds can be used including, for example, C-2, C-3, C-4, and C-5 compounds.

For several lanthanide triflate complexes, the voltammetry is first reviewed without the C-1 compound. For five lanthanides, two reductions are observed under cyclic voltammetric conditions. For each lanthanide triflate complex, $LN(OTf)_3$ where LN is a lanthanide, two well resolved reduction waves are observed. The first is for $LN^{3+}$ to $LN^{2+}$. The second wave which is about a volt negative of the first is for reduction to the LN(0) triflate or LN metal. Under cyclic voltammetric conditions, the reverse sweep to positive potentials is less well resolved. The mechanistic path for the $LN(OTf)_3$ is complex and may include $LN^{3+}+e=LN^{2+}$; $LN^{2+}+e=LN^+$; as well as a disproportionation $2LN^{2+}=LN^{3+}+LN^+$.

Electrochemical reactions of small molecule, ubiquitous species, including C-1 compounds, play important roles in energy and the environment. This includes the oxygen reduction reaction (ORR), hydrogen evolution reaction (HER), carbon dioxide reduction, and the chemistry of other organic species that contain one carbon, such as methanol, formic acid, formaldehyde, and carbon monoxide. Methane is another C-1 embodiment. The electrochemical reaction of many of these compounds are kinetically limited. For example, ORR limits performance of many fuel cell and air batteries. Increased rates of HER facilitate energy generation. The sequence of single carbon species both maps the thermodynamic advantages of organic electrochemical fuels and identifies the dominant kinetic limitations of their exploitation in practical, low temperature electrochemical energy systems. Carbon dioxide is the highest oxidation state of carbon and so the focus of study for $CO_2$ reduction to regenerate fuels and value added products as well as to remediate greenhouse gases. Voltammetry undertaken in the presence of some of these species will be presented. For example, there is clear cyclic voltammetric evidence of increased rates of oxygen reduction in acetonitrile when lanthanide triflates are present in solution and the Nafion film on the electrode. There is also evidence for enhanced electrochemistry for $CO_2$ and species in the $CO_2$ sequence of $CO_2$ reduction products including formic acid, methanol, and CO.

FIG. 1 shows a flow diagram for C-1 compound electrochemistry. The reaction sequence for C-1 chemistry is shown in the Equations 37-41, below, and the relationships between these mechanisms are presented in FIG. 1.

$$CO_2+H^++2e \leftrightarrow HCOO^-\ E^0=-0.61\ V \quad (37)$$

$$CO_2+2H^++2e \leftrightarrow CO+H_2O\ E^0=-0.53\ V \quad (38)$$

$$CO_2+6H^++6e \leftrightarrow CH_3OH+H_2O\ E^0=-0.38\ V \quad (39)$$

$$CO_2+8H^++8e \leftrightarrow CH_4+2H_2O\ E^0=-0.24\ V \quad (40)$$

$$2CO_2+2e \leftrightarrow (COO^-)_2 \quad (41)$$

Additional embodiments are described in the working examples herein.

Applications

The electrochemical methods described herein for C-1 compounds can be used in a variety of electrochemical devices and processes, including fuel cells, electrolyzers, and batteries. Fuel cells include indirect reformate fuel cells. In many indirect reformate fuel cells, the presence of carbon monoxide can poison a fuel cell catalyst such as a precious metal catalyst (e.g., platinum catalyst). Batteries include flow batteries.

In a direct reformation fuel-cell, a liquid organic fuel is added to the anode. Common examples include methanol and formic acid. For methanol, methanol undergoes a sequential two electron two proton process wherein methanol is oxidized to formaldehyde; formaldehyde is oxidized to formic acid; and formic acid is oxidized to $CO_2$. $CO_2$ is in equilibrium with carbon monoxide. In a more extreme system, methane replaces methanol to service the fuel fuel-cell. Complexities arise with fuel-cell operation due to formation of partial oxidation products associated with by-product reactions in the methanol oxidation sequence and most especially by the adsorption of carbon monoxide on to noble metal catalysts used in the anode. Under operational fuel-cell conditions, carbon dioxide and hydrogen are in equilibrium with carbon monoxide and water. Although the concentration of carbon monoxide is relatively low, less than a percent, the CO suffices to rapidly poison the fuel-cell catalyst. The electrochemical processes described herein with the lanthanide and/or actinide can be applied to the methods and devices for these applications.

Additional embodiments are provided in the following non-limiting working examples.

Working Examples

Figure 2:
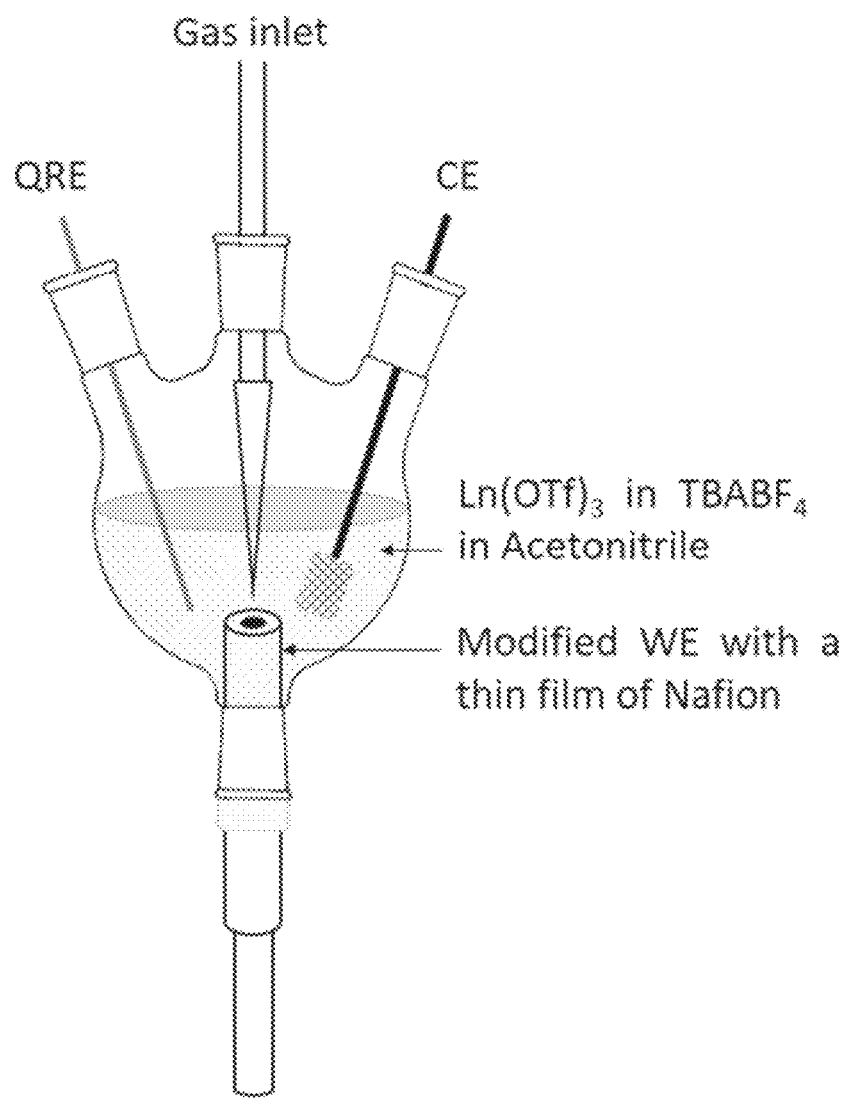
FIG. 2. WE (working electrode) setup used for CV (cyclic voltammetry). Three electrode setup with upward-facing Nafion modified Pt working electrode (WE), Ag/Ag$_2$O quasireference electrode (QRE), and Pt mesh counter electrode in Ln(OTf)$_3$ in TBABF$_4$ inacetonitrile.

Experiments were carried out to examine $CO_2$ and SiMAG C1 chemistry in the presence of lanthanide triflates in acetonitrile. Two classes of reactions were examined electrochemically: $CO_2$ reduction and C-1 chemistry. FIG. 2 shows the reactor setup.

$CO_2$ Reduction Reaction

Platinum electrode (Pine Instruments, A=0.452 cm²) was polished with 1.0, 0.3, and 0.05 µm alumina, rinsed with 18.0 MΩ deionized water and dried. The electrode was modified either with a thin film of Nafion or a thin film of magnetic microparticles composite (SiMAG) in Nafion. All films are about 5 µm thickness. For each experiment, a new film is prepared. The films were made by drop casting 5.0 µL of Nafion solution (5% w/v suspension of Nafion in 45% water and aliphatic alcohols, 1100 EQWT, Sigma Aldrich) or the magnetic microparticle suspension in Nafion on the electrode surface and allowing to air dry for 24 h. The 15% w/w suspensions of methyl, propyl, octyl, octadecyl-siloxane coated maghemite microparticles (SiMAG C-1, C3, C8, C18, 1.0 µm, Chemicell) in Nafion were used for the electrode modification. For most experiments, anhydrous ytterbium (III) trifluoromethanesulfonate ($Yb(OTf)_3$, 99.9+% pure, Sigma Aldrich) was used as the model lanthanide compound. Solutions of 1.00 mM Yb(OTf)$_3$ in 0.100 M electrolyte tetrabutylammonium tetrafluoroborate (TBABF$_4$, Sigma Aldrich) in acetonitrile (Fisher Scientific, dried over 4 A molecular sieves) are used for all electrochemical measurements. Some experiments for CO$_2$ reduction are carried out with Ln(OTf)$_3$ of Gd and Nd and 2 mM Yb(OTf)$_3$.

C-1 Compound Electrochemistry

Platinum electrode (Pine Instruments, A=0.452 cm$^2$) was polished with 1.0, 0.3, and 0.05 μm alumina, rinsed with 18.0 MΩ deionized water and dried. The electrode was modified with a thin film of Nafion of about 5 μm thickness. For each experiment a new film was prepared. The films were made by drop casting 5.0 μL of Nafion solution (5% w/v suspension of Nafion in 45% water and aliphatic alcohols, 1100 EQWT, Sigma Aldrich) on the electrode surface and allowing to air dry for 24 h. For experiments anhydrous ytterbium (III) trifluoromethanesulfonate (Yb(OTf)$_3$, 99.9+% pure, Sigma Aldrich) was used as the model lanthanide compound. 10% v/v mixtures of 96% formic acid (Sigma Aldrich), 37 wt. % formaldehyde (in water) (Sigma Aldrich), and 99.9% methanol (Fischer Scientific), each in 1.00 mM Yb(OTf)$_3$ in 0.100 M electrolyte tetrabutylammonium tetrafluoroborate (TBABF$_4$, Sigma Aldrich) in acetonitrile (Fisher Scientific, dried over 4 A molecular sieves) were used for electrochemical measurements at Nafion modified electrodes. To study CO electrochemistry, the solution was purged with 1:1 CO:H$_2$ mixture prior to measurements. No studies with micromagnets are undertaken for C-1 compound studies.

Simulation for Ln(OTf)$_3$ Electrochemistry

DigiSim® (Bioanalytical Systems, Inc.) is a commercially available simulation software to simulate electrochemical mechanism. The proposed electrochemical mechanism based on the experimental data was simulated using DigiSim.

Plausible Mechanism for Ln(OTf)$_3$ Electrochemistry

Figure 3:
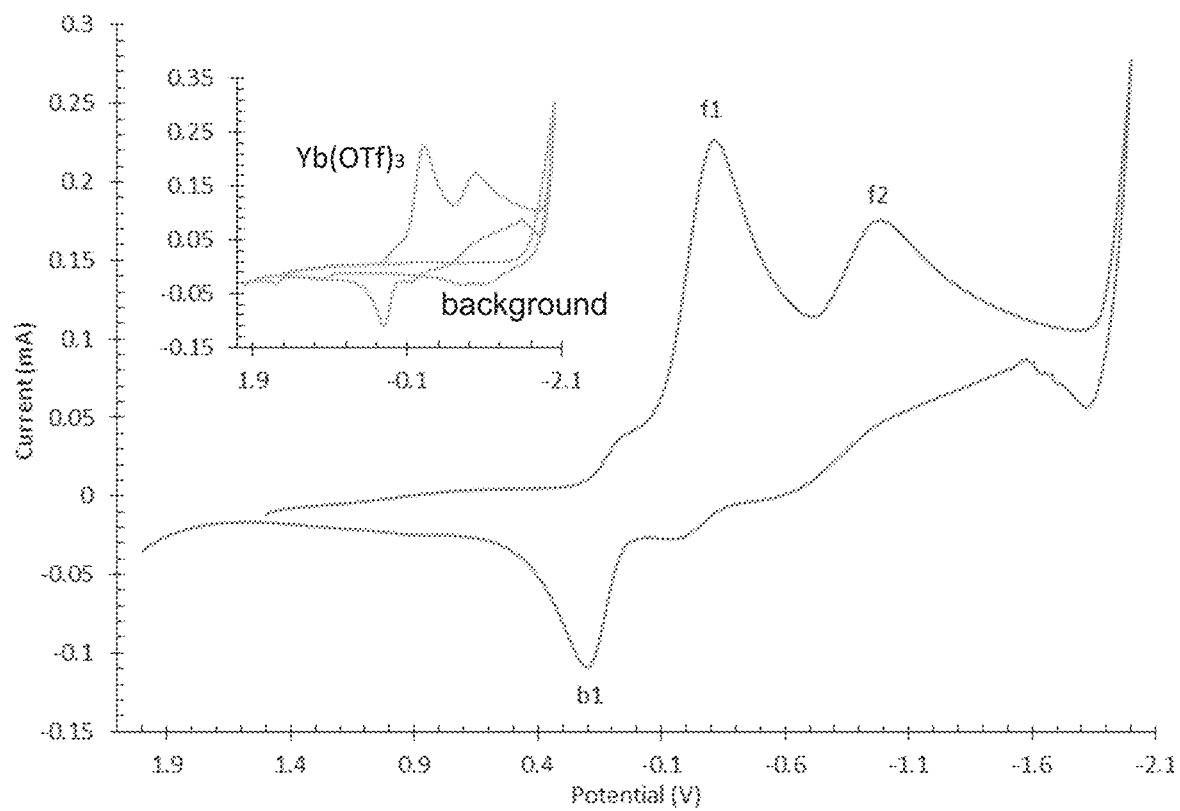
FIG. 3. CV for N$_2$ purged 1.00 mM Yb(OTf)$_3$ in 0.100 M TBABF$_4$ in acetonitrile at 50 mV/s at platinum electrode. Inset cyclic voltammograms include 1.00 mM Yb(OTf)$_3$ and background voltammogram where Yb(OTf)$_3$ is absent.

FIG. 3 is a CV for N$_2$ purged 1.00 mM Yb(OTf)$_3$ in 0.100 M TBABF$_4$ in acetonitrile at 50 mV/s. This is a representative CV for several scans of the Yb(OTf)$_3$. Inset plot is an overlay with the blank, N$_2$ purged 0.100 M TBABF$_4$, where no interfering peaks were observed. The CV has two well resolved reductive peaks, labeled as f1 and f2 and a well resolved oxidative peak labeled as b1. There are several features in both oxidative and reductive sweeps. DigiSim was used to simulate the experimental data. Based on the features in CV, EECE mechanism was proposed for the Ln(OTf)$_3$ electrochemistry where two electron transfer reaction take place followed by a homogeneous chemical reaction, which is followed by a third electron transfer reaction. Equations 42-45 represent the EECE mechanism.

$$Yb^{3+} + e \leftrightarrow Yb^{2+} \quad E°_1 \tag{42}$$

$$Yb^{2+} + e \leftrightarrow Yb^+ \quad E°_2 \tag{43}$$

$$2Yb^{2+} \leftrightarrow Yb^{3+} + Yb^+ \quad K_{eq1} \tag{44}$$

$$Yb^+ + e \leftrightarrow Yb \quad E°_3 \tag{45}$$

For electron transfer reactions in Equations 42, 43, and 45, the standard potentials are $E°_1$, $E°_2$, and $E°_3$. Simulation parameters were set for these reactions. For Equation 42, $E°_1$=0.17 V, $\alpha_1$=0.35, and $k_1$=5×10$^{-6}$ cm/s. For Equation 43, $E°_2$=0.20 V, $\alpha_2$=0.10, and $k_2$=0.9 cm/s. For Equation 45, $E°_3$=−0.70 V, $\alpha_3$=0.25, and $k_3$=5×10$^{-5}$ cm/s. Then simulation parameters were set for the homogeneous chemical reaction Equation 44 where $K_{eq1}$=3.2137, $k_{f1}$=100, and $k_{b1}$=31.116.

Figure 4:
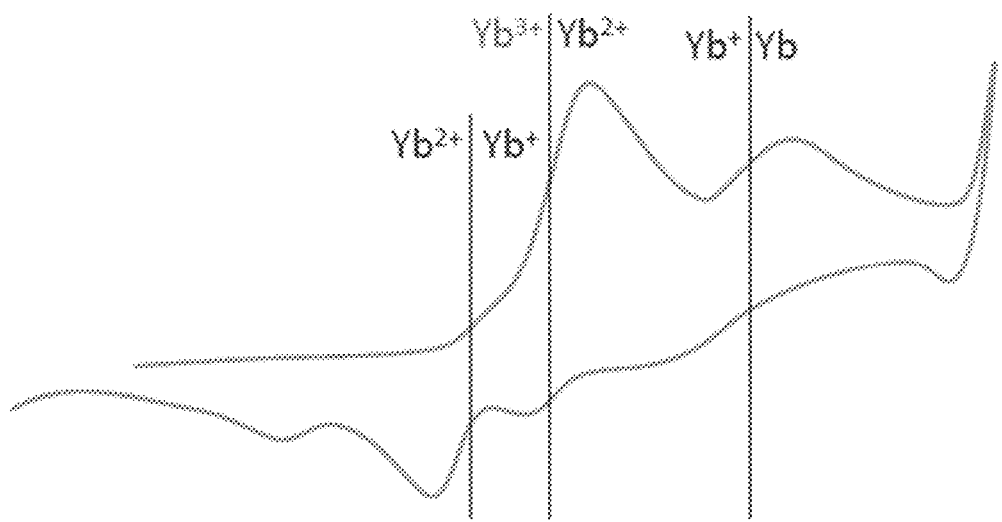
FIG. 4. Cyclic voltammetric waves labeled with the plausible EECE mechanism of Ln(OTf)$_3$ electrochemistry where here Ln is Yb. T h e labels are shown for the CV for N$_2$ purged 1.00 mM Yb(OTf)$_3$ in 0.100 M TBABF$_4$ in acetonitrile at 50 mV/s at platinum electrode.
Figure 5:
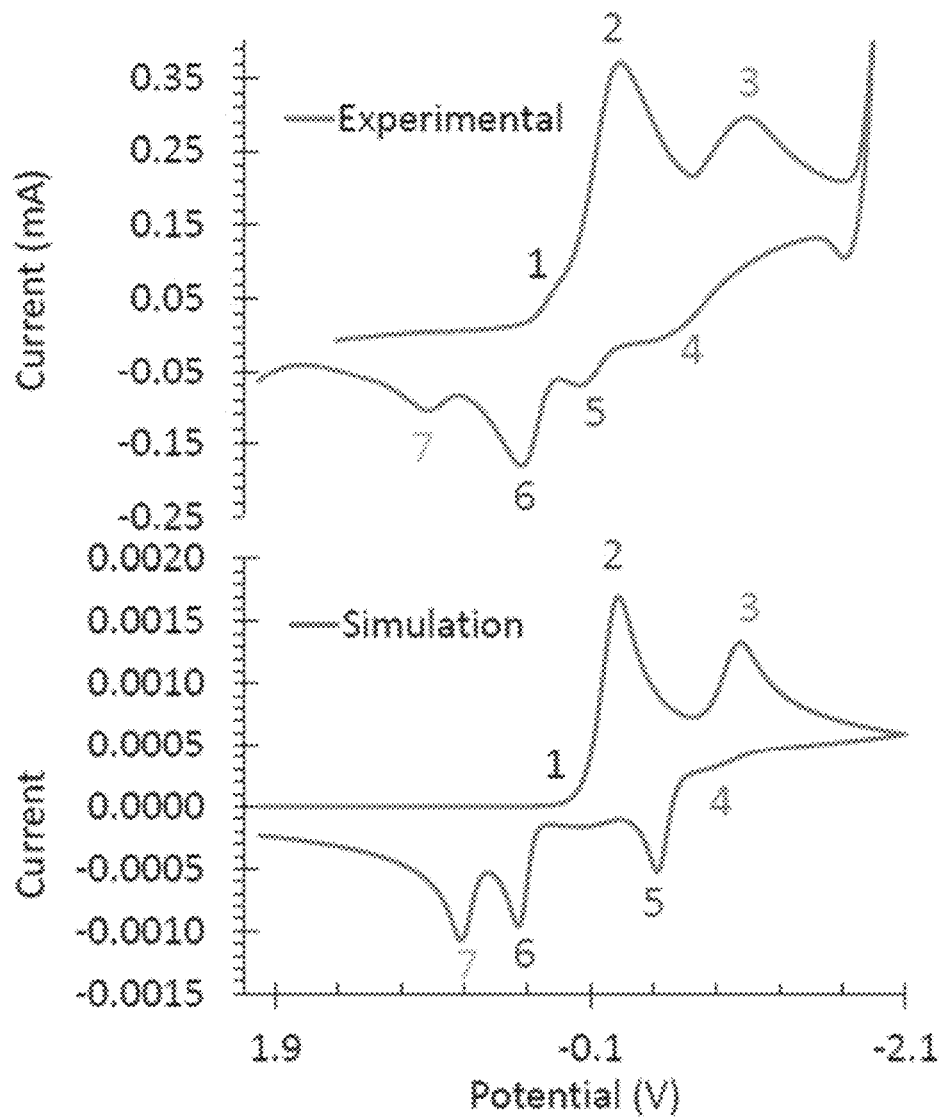
FIG. 5. CV for N$_2$ purged 1.00 mM Yb(OTf)$_3$ in 0.100 M TBABF$_4$ in acetonitrile at 200 mV/s (top) is simulated using DigiSim Software© (bottom).

FIG. 4 is a representation of the "potential axis" for the proposed mechanism. For clarity, potentials were marked on the CV rather than in an actual potential axis. FIG. 5 is a comparison between experimental data and simulation. In FIG. 5, all corresponding major and minor features are marked with a same number for experimental data and simulation. It is important to note that $E°_3 < E°_1 <$ and $E°_2$. Disproportionation reactions contribute significantly to the voltammetric morphology. Even though $E°_1 < E°_2$, during the reductive sweep, Yb$^{2+}$ is not present to undergo reduction. As the potential is swept further in the negative direction, Yb$^{3+}$ is present to undergo reduction and produce Yb$^{2+}$, resulting in Peak 2 in FIG. 5. The potentials $E°_1$ and $E°_2$ are sufficiently close that Yb$^{2+}$ is produced where Yb$^{2+}$ can undergo reduction to form Yb$^+$. This is not appeared as a prominent peak, but a small feature marked as Peak1. More Yb$^{2+}$ will form as potential is swept negative. Now Yb$^{2+}$ will undergo a homogeneous chemical reaction, a disproportionation to produce Yb$^{3+}$ and Yb$^+$. As potential approaches $E°_3$, Yb$^+$ will undergo reduction to form Yb to generate the other prominent reductive peak, Peak3. In the oxidative wave there are peaks or small features that can be accounted for oxidative peaks of Peak1, 2, and 3. However, in the simulation Peak7 also seemed to be prominent. The simulation and the experimental data are not an exact fit, but the prominent features of the experimental data are captured by the EECE mechanism. It is anticipated that for different lanthanide species, slightly different parameters will be needed to simulate the response.

Effect on CO$_2$ Reduction Reaction

Figure 6:
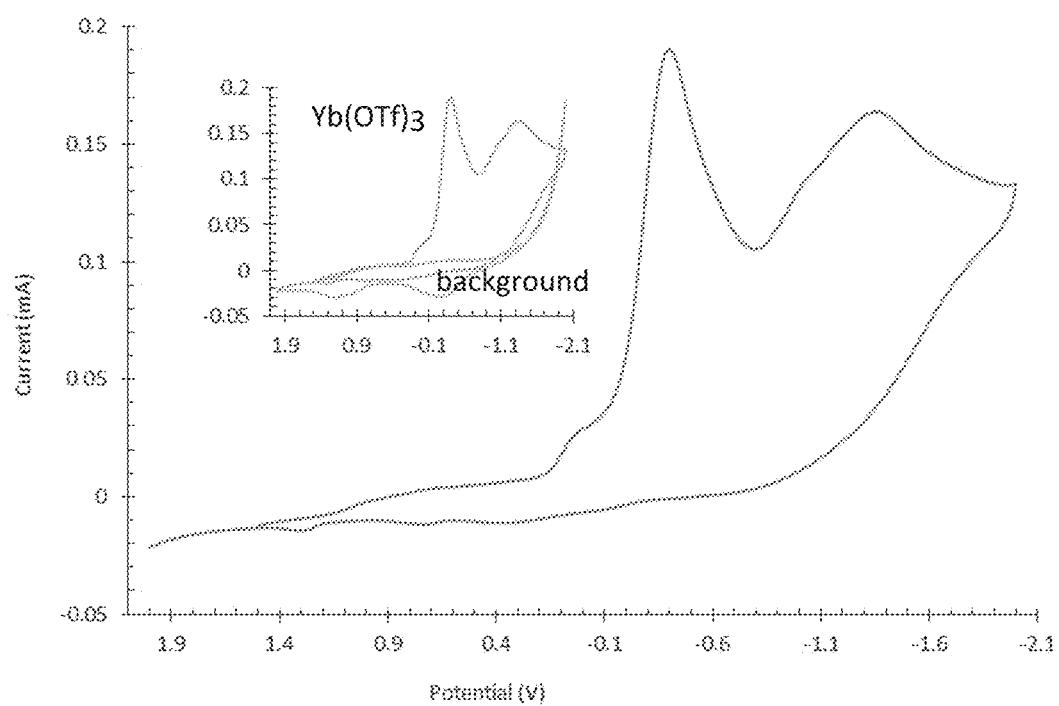
FIG. 6. CV for CO$_2$ purged 1.00 mM Yb(OTf)$_3$ in 0.100 M TBABF$_4$ in acetonitrile at 50 mV/s at a platinum electrode. Inset plot is an overlay with the blank (no CO$_2$) at 50 mV/s.
Figure 7:
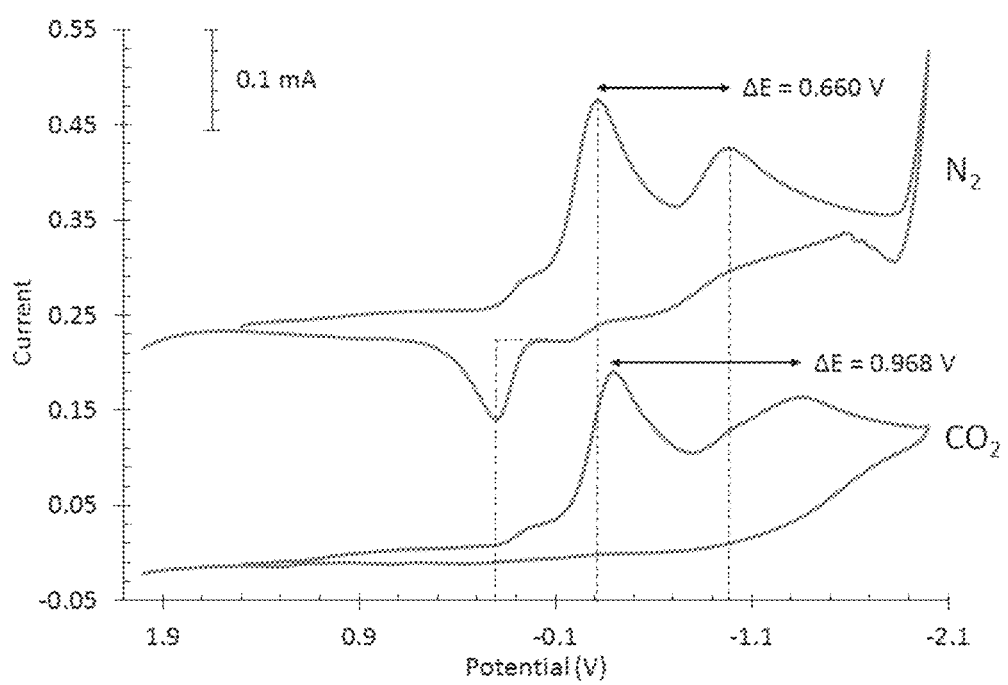
FIG. 7. Comparison of CV for N$_2$ and CO$_2$ purged 1.00 mM Yb(OTf)$_3$ in 0.100 M TBABF$_4$ in acetonitrile at 50 mV/s at a platinum electrode. Plots are presented as a vertical offset for clarity and the scale is indicated.

FIG. 6 is a CV for CO$_2$ purged 1.00 mM Yb(OTf)$_3$ in 0.100 M TBABF$_4$ in acetonitrile at 50 mV/s. Inset plot is an overlay with the blank, CO$_2$ purged 0.100 M TBABF$_4$, where no interfering peaks were observed. In FIG. 7, the main differences between CV for N$_2$ purged and CO$_2$ purged Yb(OTf)$_3$ are shown. The most obvious difference is the absence of oxidative peak in CO$_2$ purged experiment. This is evidence for an irreversible chemical step (C$_i$). In addition, larger peak splitting during reductive sweep was observed for CO$_2$ purged experiment, which was 0.968 V, compared to 0.660 V in N$_2$ purged experiment. Also, there is a peak shift in the reductive sweep and this is a shift towards negative potentials. Larger potential windows were scanned to confirm this is not an effect from the quasireference electrode potential shift. The potential shift is likely evidence for a preceding reaction (CE) [Bard, A. et al., Electrochemical Methods; John Wiley & Sons, Inc.: New York, Second ed.: 2001], chemical reaction followed by an electron transfer reaction in the presence of CO$_2$.

Figure 8:
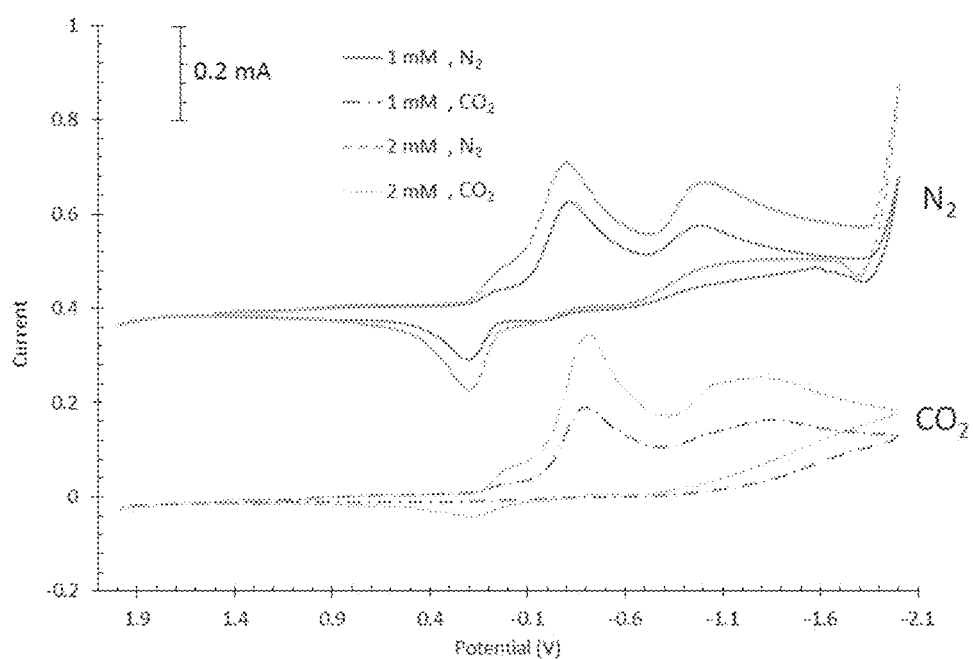
FIG. 8. Comparison of CV for N$_2$ purged 1.00 mM (solid line, top), 2.00 mM (dashed line, top) and CO$_2$ purged 1.00 mM (mixed dash-dot line, bottom), 2.00 mM (dotted line, bottom) Yb(OTf)$_3$ in 0.100 M TBABF$_4$ in acetonitrile at 50 mV/s at a platinum electrode. Plots are presented as a vertical offset for clarity and the scale is indicated.

To confirm the occurrence of chemical reactions in the presence of CO$_2$, the experiment was repeated with 2.00 mM Yb(OTf)$_3$. FIG. 8 has the CV for 1.00 mM and 2.00 mM Yb(OTf)$_3$ when N$_2$ and CO$_2$ purged. At a higher concentration of Yb(OTf)$_3$, the same differences, absences of the oxidative peak, higher peak splitting and reductive peak shifting are observed. However, a small feature can be seen in the oxidative wave with 2.00 mM Yb(OTf)$_3$ because now Yb(OTf)$_3$ is not the limiting reagent even though it still takes part in an irreversible chemical reaction. This experiment confirmed the occurrence of chemical reactions in the presence of CO$_2$ and Yb(OTf)$_3$.

Figure 9:
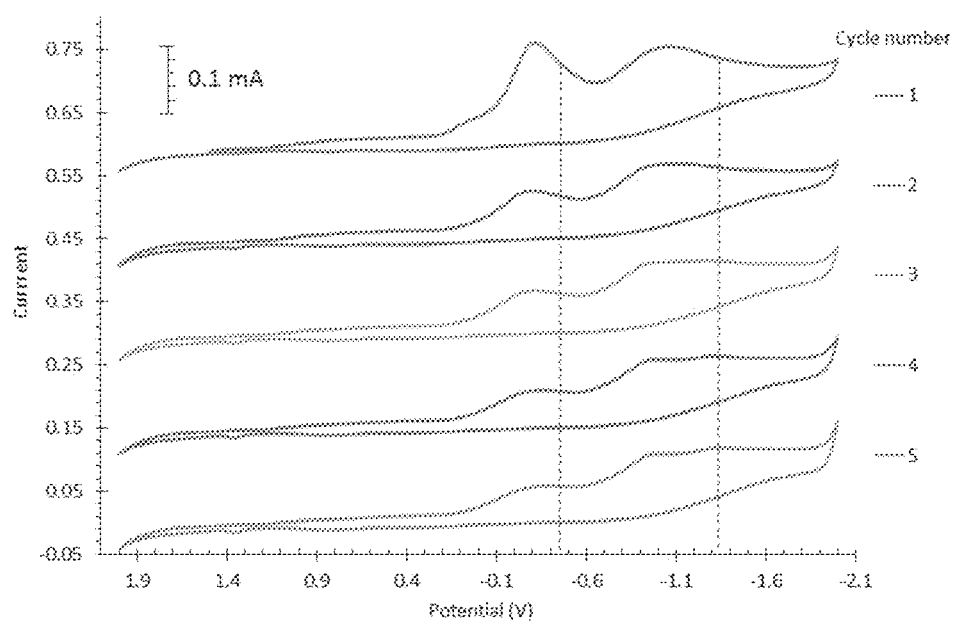
FIG. 9. CV for 1.00 mM Yb(OTf)$_3$ in 0.100 M TBABF$_4$ in acetonitrile at 50 mV/s at a platinum electrode when the system is purged with CO$_2$ and the potential is scanned immediately after each cycle. Cycle number 1-5 are indicated in the plot. Plots are presented as a vertical offset for clarity and the scale is indicated.
Figure 10:
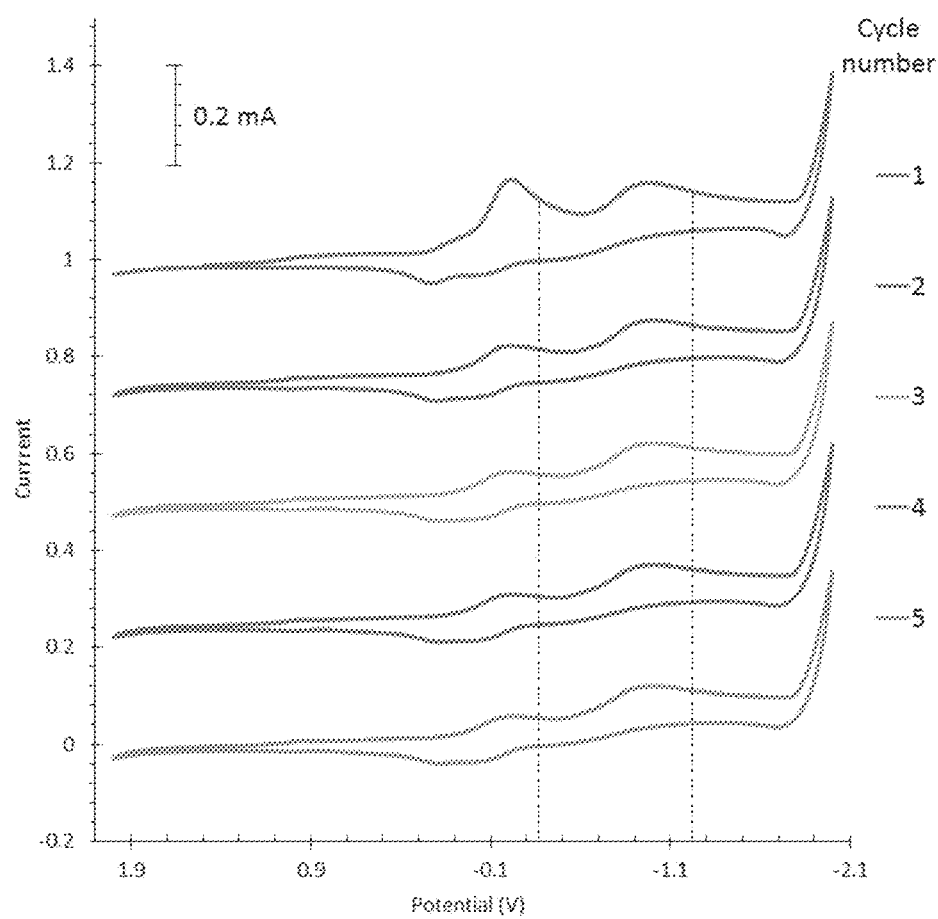
FIG. 10. CV for 1.00 mM Yb(OTf)$_3$ in 0.100 M TBABF$_4$ in acetonitrile at 50 mV/s at a platinum electrode when the system is purged with N$_2$ and the potential is scanned immediately after each cycle. Cycle number 1-5 are indicated in the plot. Plots are presented as a vertical offset for clarity and the scale is indicated.

A potential cycling experiment was done to get further mechanistic insight. FIG. 9 has CV for five consecutive CV runs and the cycle number is indicated in the plot. When increasing cycle number, compared to the first cycle, the diffusion features of the reductive peaks disappear. Along the vertical dashed lines inserted in the plot, this can be clearly observed. Eventually the current is a plateau rather than a diffusion wave. This is evidence for a catalytic reaction [Bard, A. et al., *Electrochemical Methods*; John Wiley & Sons, Inc.: New York, Second ed.: 2001] in the presence of $CO_2$ and $Yb(OTf)_3$. CV for potential cycling when $CO_2$ purged in FIG. 9 can be compared with the CV for potential cycling when $N_2$ purged in FIG. 10. In FIG. 10, along the marked vertical lines, the diffusional features persist with the increasing cycle number.

Figure 11:
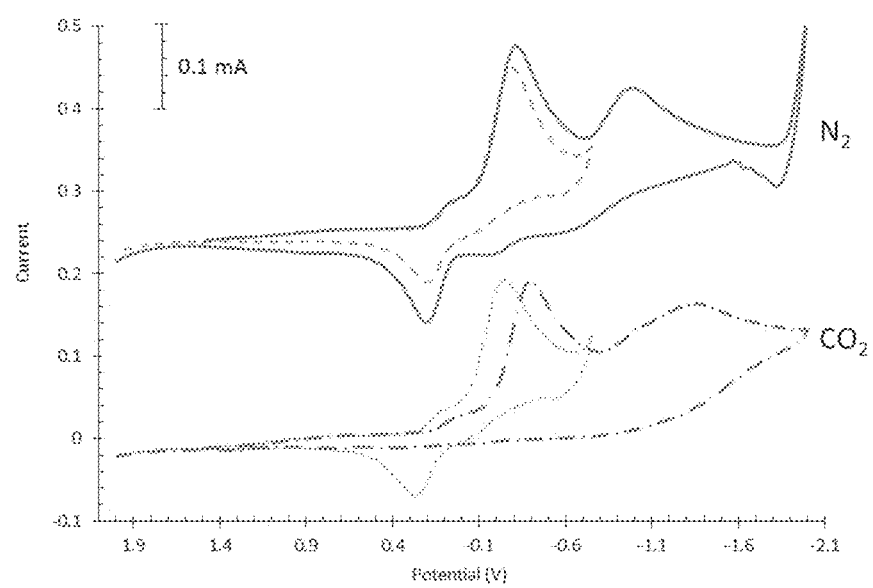
FIG. 11. Comparison of CV for 1.00 mM Yb(OTf)$_3$ in 0.100 M TBABF$_4$ in acetonitrile at 50 mV/s at a platinum electrode when the system is purged with N$_2$ and scanned a wider potential window (solid line, top) and a shorter potential window (dash line, top) and when the system is purged with CO$_2$ and scanned a wider potential window (dash-dot line, bottom) and a shorter potential window (dotted line, bottom). Plots are presented as a vertical offset for clarity and the scale is indicated.

A shorter potential window is scanned to understand which lanthanide species mediate $CO_2$ reduction. FIG. 11 has CV for shorter and wider potential windows for $N_2$ and $CO_2$ purged experiments. The oxidative peak is present in all the CV except the $CO_2$ purged wider potential experiment. Presence of the oxidative peak in the CV for $CO_2$ purged shorter potential scanned experiment indicates that the $Yb^0$ is the important species in $CO_2$ reduction mediation and not $Yb^{2+}$ or $Yb^+$.

Figure 12:
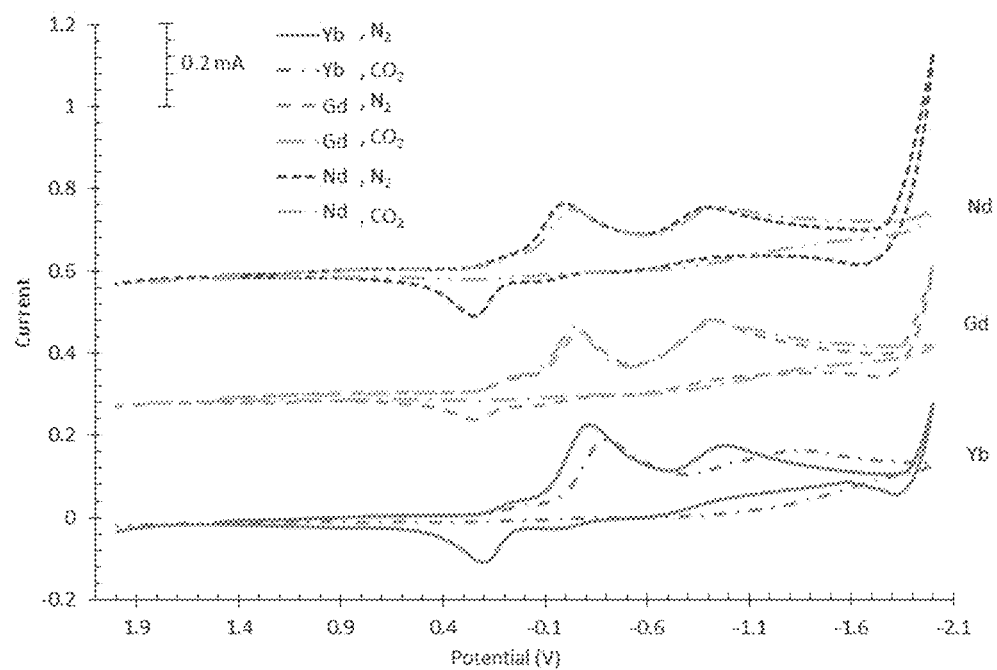
FIG. 12. Comparison of CV for 1.00 mM Yb(OTf)$_3$ at a platinum electrode, N$_2$ purged (solid line), CO$_2$ purged (dash-double dot line), 1.00 mM Gd(OTf)$_3$, N$_2$ purged (dash line), CO$_2$ purged (long dash-dot line), 1.00 mM Nd(OTf)$_3$, N$_2$ purged (square-dot line), and CO$_2$ purged (dash-two dots line) in 0.100 M TBABF$_4$ in acetonitrile at 50 mV/s.

From the shorter potential window scan experiment, there is evidence that the $Yb^0$ is the important species to mediate $CO_2$ reduction. To study if different lanthanides have a different degree of effect on the reaction, experiments are done with Gd and Nd complexes. The selection is based on the number of unpaired electron of $Ln^0$ state. The electron configurations are $Nd=[Xe]\ 4f^4\ 6s^2$, $Gd=[Xe]\ 4f^7\ 5d^1\ 6s^2$, and $Yb=[Xe]\ 4f^{14}\ 6s^2$ so that the number of unpaired electrons vary Yb (0)<Nd (4)<Gd (8). FIG. 12 shows CV for $Ln(OTf)_3$ of Yb, Nd, and Gd in the presence of $N_2$ and $CO_2$. With all the lanthanides, in the presence of $CO_2$, the oxidative peak is absent. However, the most shift in reductive peak positions and the highest peak splitting are observed with Yb, the lanthanide with no unpaired electrons. For $Yb^0$, the larger shift in the peak f2 in the presence of $CO_2$ is consistent with more input energy (voltage) to drive $CO_2$ reduction. The $Nd^0$ and $Gd^0$ both have a significant number of unpaired electrons. For both $Nd^0$ and $Gd^0$, the $CO_2$ is reduced without any shift in potential. No additional voltage (overvoltage) is necessary to drive the $CO_2$ reduction in the presence of either $Nd^0$ or $Gd^0$. The unpaired electrons contribute to facilitate the reduction of $CO_2$ as noted by the suppressed oxidative wave b1. The increase in the rate when unpaired electrons are available is consistent with spin an important part of electron transfer processes.

Magnetic Field Effects

Figure 13:
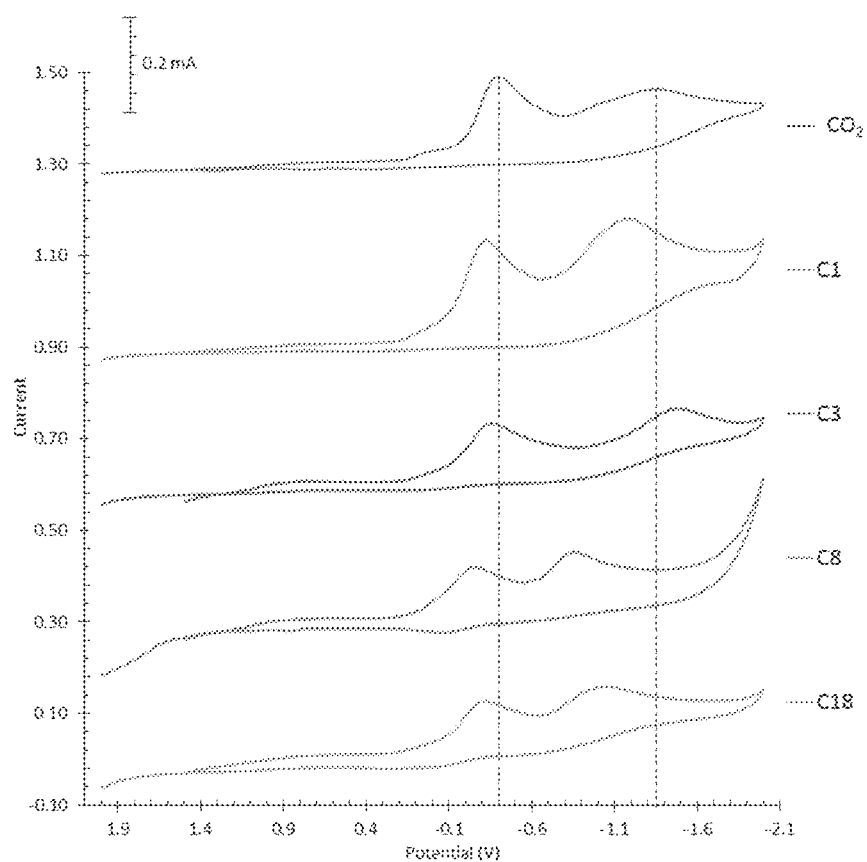
FIG. 13. CV for 1.00 mM Yb(OTf)$_3$ in 0.100 M TBABF$_4$ in acetonitrile at 50 mV/s at a platinum electrode when the system is purged with CO$_2$ with Nafion modified WE and magnetically modified WE with SiMAG C1, C3, C8, and C18. Plots are presented as a vertical offset for clarity and the scale is indicated.

Magnetic field effects on the $CO_2$ reduction reaction in the presence of lanthanides is studied. FIG. 13 has the CV for 1.00 mM $Yb(OTf)_3$ in 0.100 M $TBABF_4$ in acetonitrile when the system was purged with $CO_2$ and Nafion modified WE and magnetically modified WE with SiMAG C1, C3, C8, and C18. SiMAG particles are classified according to the number of carbon atoms in their siloxane chain. Therefore, different SiMAG particles have different volume magnetic susceptibilities. From a simplistic view, C1 is expected have the highest volume magnetic susceptibility and C18 is expected to have the least. From the experimental data, there is a significant effect from all SiMAG particles except C3. There is only a slight effect from C3. All other particles shifted the peak potentials positive for both reductive peaks in the order C18>C1>C8. However, C1 had effect on the magnitude of the current as well. The magnetic field effects had a significant impact on $CO_2$ reduction in the presence of lanthanides. Larger impacts are found with stronger magnetic particles.

Effect on C-1 Compound Electrochemistry

Figure 14:
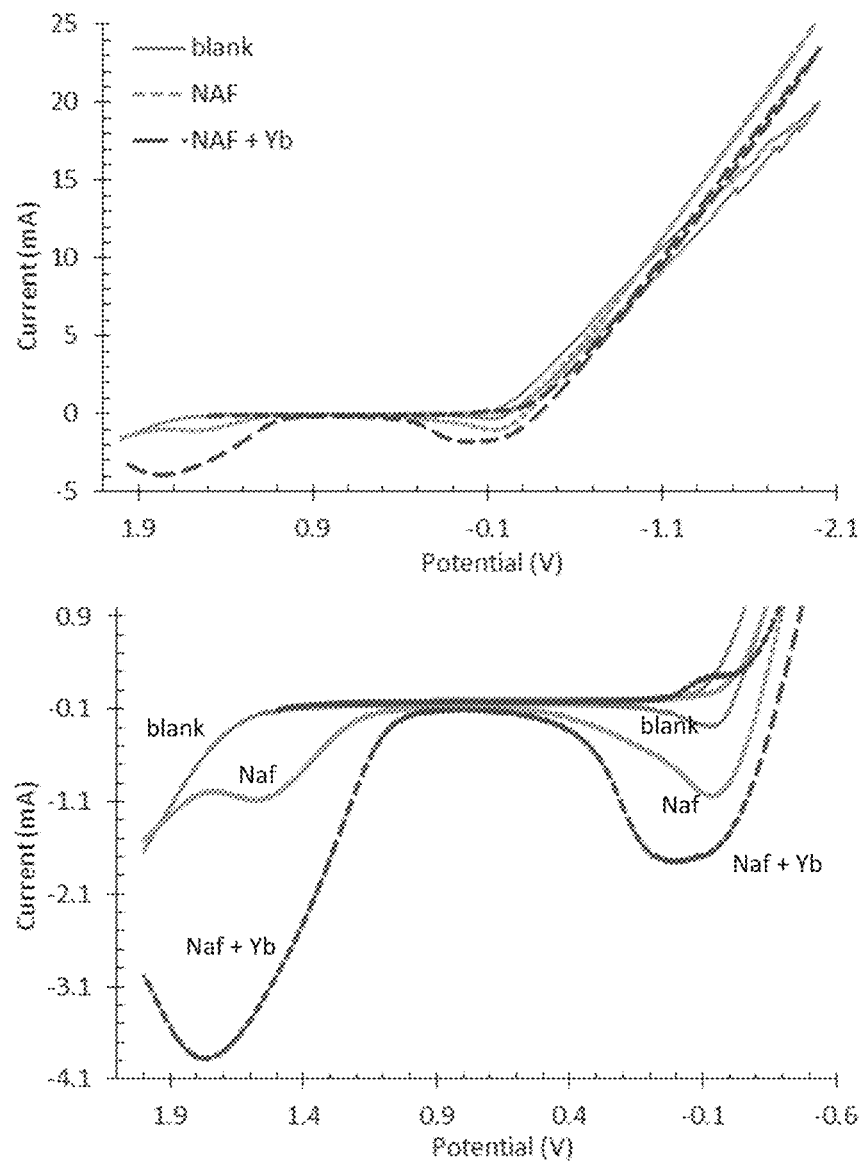
FIG. 14. CV at 50 mV/s at a platinum electrode with unmodified WE for 10% v/v mixture of 96% formic acid in 0.100 M TBABF$_4$ in acetonitrile (blank, solid line), Nafion modified WE for 10% v/v mixture of 96% formic acid in 0.100 M TBABF$_4$ in acetonitrile (NAF, dash line), Nafion modified WE for 10% v/v mixture of 96% formic acid in 0.100 M TBABF$_4$ in acetonitrile with 1.00 mM Yb(OTf)$_3$ (NAF+Yb, long dash—dotted line) (top) and a expansion of the oxidative sweep for clarity (bottom). The solutions are degassed with N$_2$.

To investigate the effect of new electrochemical method on electrochemistry of formic acid CV was performed in 10% v/v mixture of 96% formic acid in 0.100 M $TBABF_4$ in acetonitrile in the presence and absence of 1.00 mM $Yb(OTf)_3$. FIG. 14 has CV with unmodified WE labeled as blank and Nafion modified WE labeled as NAF in 10% v/v mixture of 96% formic acid in 0.100 M $TBABF_4$ in acetonitrile. The CV with Nafion modified WE in 10% v/v mixture of 96% formic acid in 0.100 M $TBABF_4$ in acetonitrile with 1.00 mM $Yb(OTf)_3$ is labeled as NAF+Yb. Compared to the blank and NAF, in the presence of lanthanides NAF+Yb has a significant impact on electrochemistry. The effect is largest on formic acid oxidation with significant increase in the magnitude of the current. Possibly, lanthanide is mediating reaction as a metal catalyst.

Figure 15:
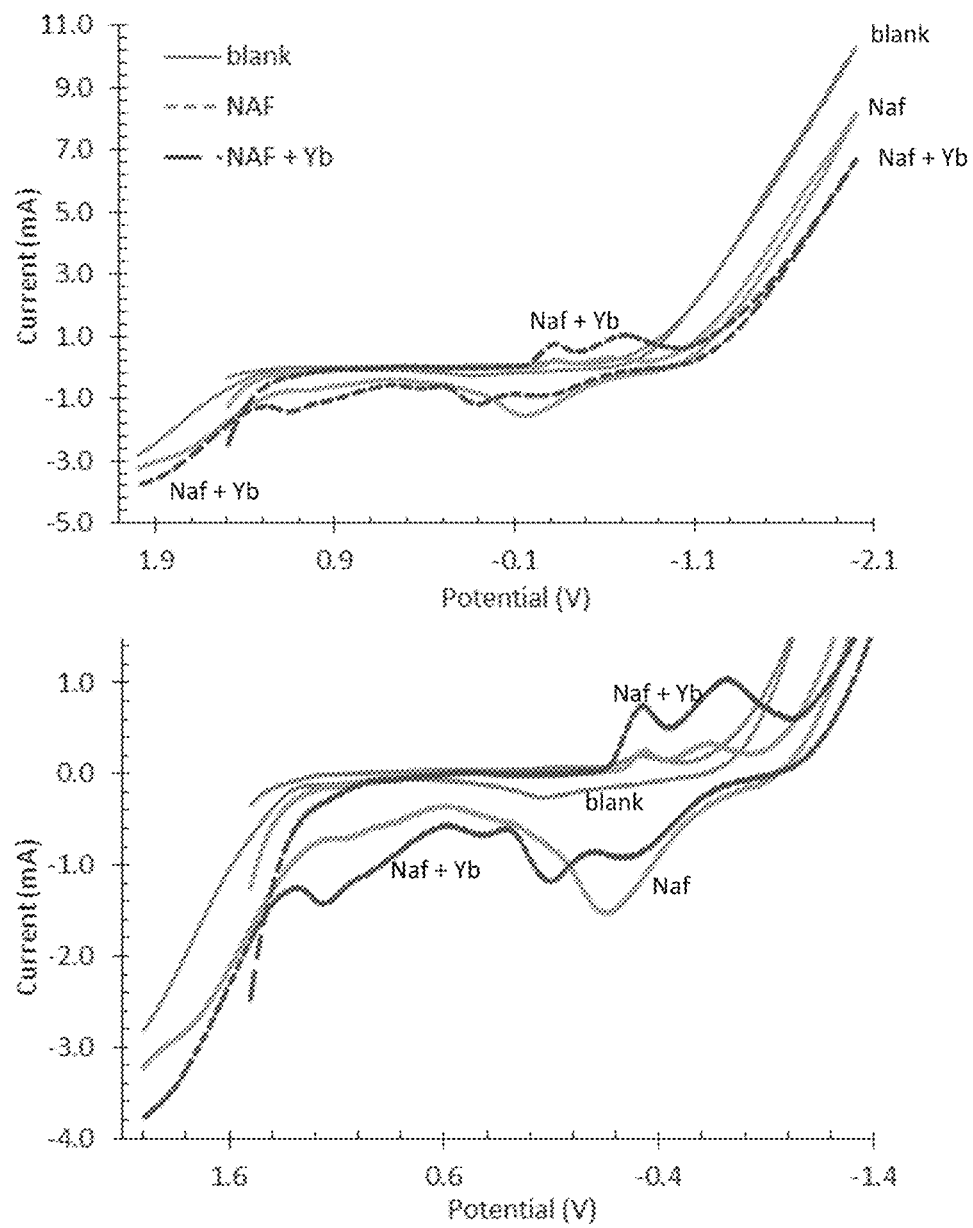
FIG. 15. CV at 50 mV/s at a platinum electrode with unmodified WE for 10% v/v mixture of 37 wt. % formaldehyde (in water) in 0.100 M TBABF$_4$ in acetonitrile (blank, solid line), Nafion modified WE for 10% v/v mixture of 37 wt. % formaldehyde (in water) in 0.100 M TBABF$_4$ in acetonitrile (NAF, dashed line), Nafion modified WE for 10% v/v mixture of 37 wt. % formaldehyde (in water) in 0.100 M TBABF$_4$ in acetonitrile with 1.00 mM Yb(OTf)$_3$ (NAF+Yb, long dash—dotted line) (top) and a expansion of the oxidative sweep for clarity (bottom). The solutions are degassed with N$_2$.

The effect of lanthanide triflates on electrochemistry of formaldehyde was studied next. CV was performed in 10% v/v mixture of 37 wt. % formaldehyde (in water) in 0.100 M $TBABF_4$ in acetonitrile in the presence and absence of 1.00 mM $Yb(OTf)_3$. FIG. 15 has CV with unmodified WE labeled as blank and Nafion modified WE labeled as NAF in 10% v/v mixture of 37 wt. % formaldehyde (in water) in 0.100 M $TBABF_4$ in acetonitrile. The CV with Nafion modified WE in 10% v/v mixture of 37 wt. % formaldehyde (in water) in 0.100 M $TBABF_4$ in acetonitrile with 1.00 mM $Yb(OTf)_3$ is labeled as NAF+Yb. Among the C-1 compounds, in the presence of lanthanides, the voltammetry of formaldehyde was impacted. NAF and NAF+Yb had similar magnitudes of currents. However, both are significantly better compared to blank.

Figure 16:
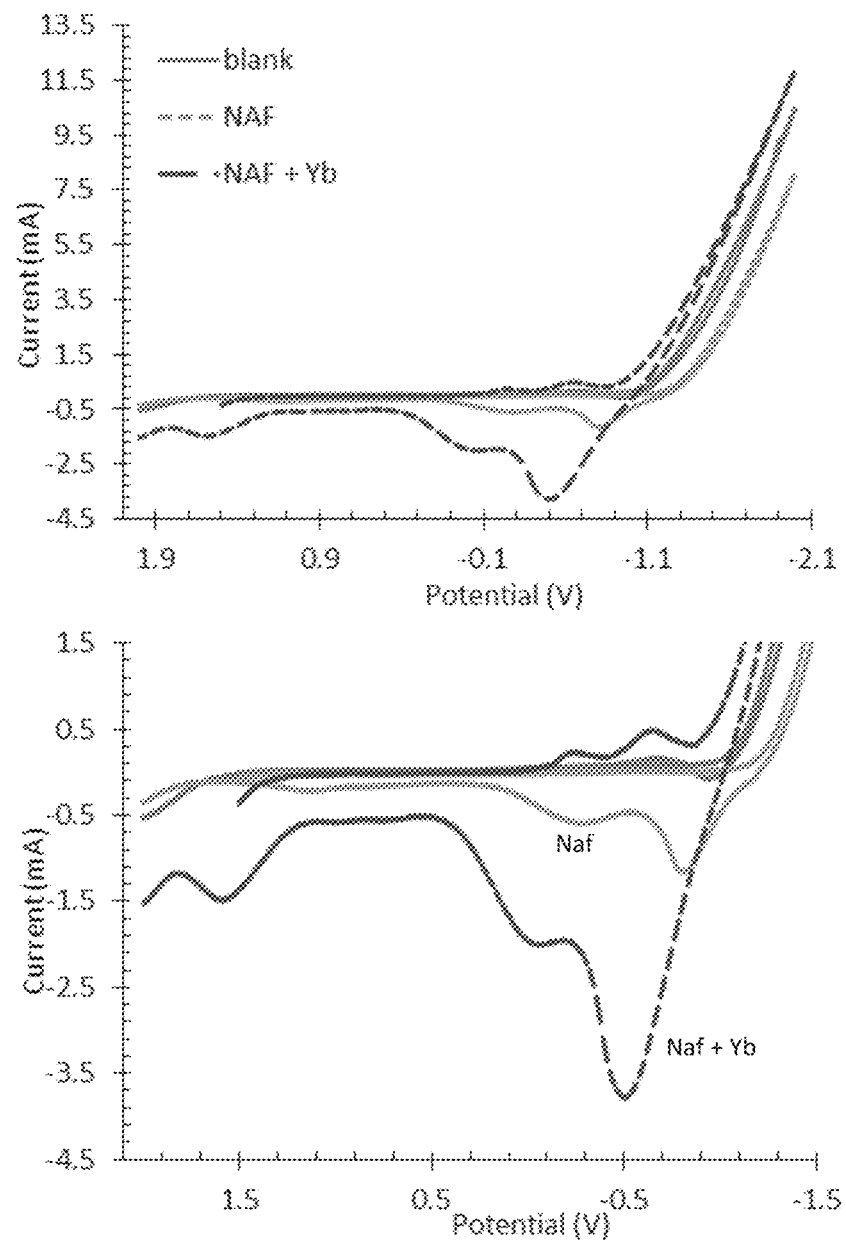
FIG. 16. CV at 50 mV/s at a platinum electrode with unmodified WE for 10% v/v mixture of 99.9% methanol in 0.100 M TBABF$_4$ in acetonitrile (blank, solid line), Nafion modified WE for 10% v/v mixture of 99.9% methanol in 0.100 M TBABF$_4$ in acetonitrile (NAF, dashed line), Nafion modified WE for 10% v/v mixture of 99.9% methanol in 0.100 M TBABF$_4$ in acetonitrile with 1.00 mM Yb(OTf)$_3$ (NAF+Yb, long dash—dotted line) (top) and a expansion of the oxidative sweep for clarity (bottom). The solutions are degassed with N$_2$.

To investigate the effect of new electrochemical method on electrochemistry of methanol CV is performed in 10% v/v mixture of 99.9% methanol in 0.100 M $TBABF_4$ in acetonitrile in the presence and absence of 1.00 mM $Yb(OTf)_3$. FIG. 16 has CV with unmodified WE labeled as blank and Nafion modified WE labeled as NAF in 10% v/v mixture of 99.9% methanol in 0.100 M $TBABF_4$ in acetonitrile. The CV with Nafion modified WE in 10% v/v mixture of 99.9% methanol in 0.100 M $TBABF_4$ in acetonitrile with 1.00 mM $Yb(OTf)_3$ is labeled as NAF+Yb. Compared to the blank and NAF, in the presence of lanthanides NAF+Yb has a significant impact on electrochemistry. The effect is most on methanol oxidation with significant increase in the magnitude of the current. Possibly, lanthanide is mediating reaction as a metal catalyst.

Among the C-1 compounds, methanol had the most significant impact on electrochemistry.

Figure 17:
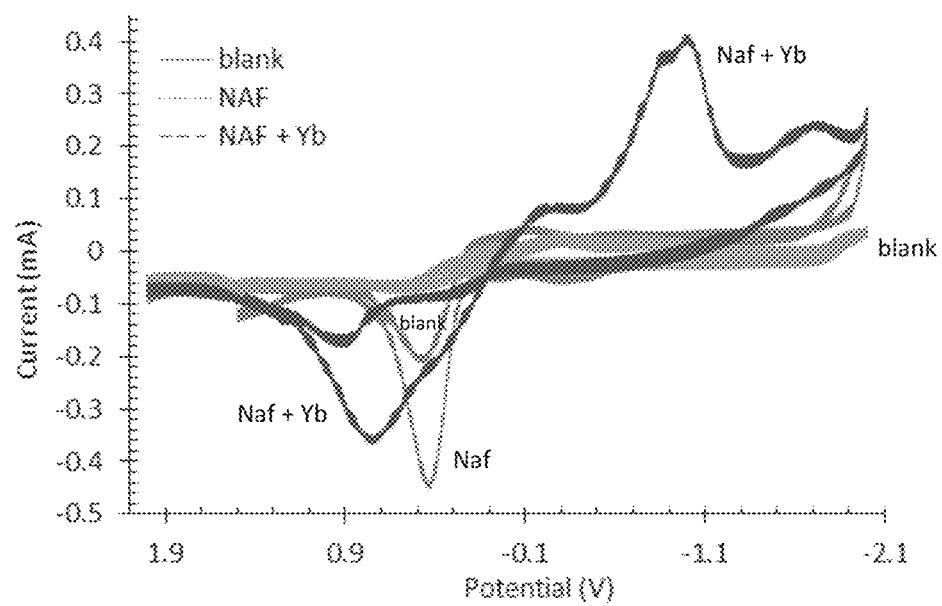
FIG. 17. CV at 50 mV/s with unmodified WE when the solution of 0.100 M TBABF$_4$ in acetonitrile is purged with 1:1 CO:H$_2$ mixture (blank, solid line), Nafion modified WE when the solution of 0.100 M TBABF$_4$ in acetonitrile is purged with 1:1 CO:H$_2$ mixture (NAF, dashed line), Nafion modified WE when the solution of 1.00 mM Yb(OTf)$_3$ in 0.100 M TBABF$_4$ in acetonitrile is purged with 1:1 CO:H$_2$ mixture (NAF+Yb, long dash—dotted line). The potential scan is +2.0 V to −2.0 V to +2.0 V.
Figure 18:
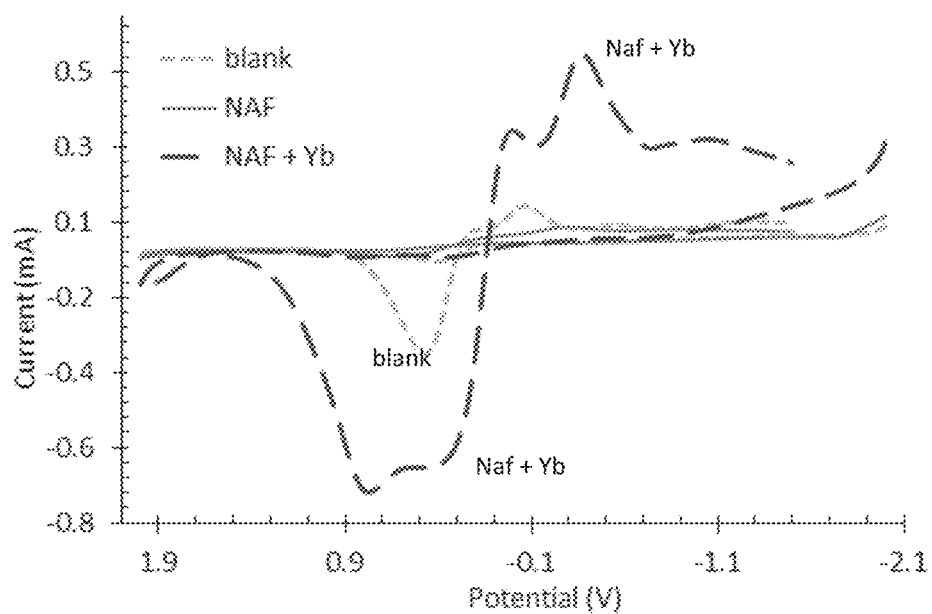
FIG. 18. CV at 50 mV/s at a platinum electrode with unmodified WE when the solution of 0.100 M TBABF$_4$ in acetonitrile is purged with 1:1 CO:H$_2$ mixture (blank, solid line), Nafion modified WE when the solution of 0.100 M TBABF$_4$ in acetonitrile is purged with 1:1 CO:H$_2$ mixture (NAF, short dashed line), Nafion modified WE when the solution of 1.00 mM Yb(OTf)$_3$ in 0.100 M TBABF$_4$ in acetonitrile is purged with 1:1 CO:H$_2$ mixture (NAF+Yb, long dash—dotted line). The potential scan is −2.0 V to +2.0 V to −2.0 V.

To investigate the effect of lanthanide triflate on electrochemistry of CO, the solution of 0.100 M $TBABF_4$ in acetonitrile was purged with 1:1 $CO:H_2$ mixture in acetonitrile in the presence and absence of 1.00 mM $Yb(OTf)_3$ prior to measurements. For CV in FIG. 17, the potential is scanned +2.0 V to −2.0 V to +2.0 V, whereas for CV in FIG. 18 potential is scanned −2.0 V to +2.0 V to −2.0 V. These plots have CV with unmodified WE labeled as blank and Nafion modified WE labeled as NAF in 0.100 M $TBABF_4$ in acetonitrile. The CV with Nafion modified WE in 0.100 M $TBABF_4$ in acetonitrile with 1.00 mM $Yb(OTf)_3$ is labeled as NAF+Yb. Compared to the blank and NAF, in the presence of lanthanides NAF+Yb has a significant impact on electrochemistry. There is significant increase in the magnitude of the current. Possibly, lanthanide is mediating reaction as a metal catalyst.

In general, the presence of the lanthanide triflates increases the efficiency of electrochemical reduction and oxidation of C-1 compounds. The notable impact on CO oxidation may be an important component in the increased catalytic efficiency. Under conditions with no lanthanides, platinum electrodes in the presence of carbon monoxide are rapidly passivated. In CV, electrochemical removal of the platinum oxide is noted by a bell-shaped oxidative wave as shown for the blank in FIG. 18. On introduction of lanthanide, CO adsorption that passivates platinum is at least suppressed. Thus, the presence of lanthanides may facilitate C-1 chemistry because passivation to carbon monoxide is increased. The increased currents found with the various C-1 compounds in the presence of $Yb^0$ may indicate a general facilitation electron transfer reactions in the presence of lanthanides. Based on the outcomes for $CO_2$, where $Gd^0$ and $Nd^0$ are more effective catalyst than $Yb^0$, yet more efficient catalysis may be found on use of triflates and lanthanides with unpaired electron spins.

In sum, lanthanides play important roles in numerous advanced technologies. Herein, a bench top, inexpensive, and user-friendly electrochemical method was developed for lanthanide voltammetry relevant to C-1 compound electrochemistry. Lanthanide electrochemistry is enabled in acetonitrile at a Nafion modified Pt electrode in the presence of triflate (OTf) ligands. Formal potential for $Ln(OTf)_3$ shifted to acetonitrile solvent window in the presence of triflate ligands. Applications of the method in electrocatalysis were investigated. In these working examples, studies on $CO_2$ reduction and C-1 compound electrochemistry were presented.

Electrochemical mechanism, EECE was proposed for $Ln(OTf)_3$ electrochemistry. The mechanism was evaluated by simulation. The small feature before f1 peak was assigned to $Yb^{2+}$ to $Yb^+$ reduction. f1 peak was for reduction of $Yb^{3+}$ to $Yb^{2+}$ and f2 peak for reduction of $Yb^+$, produced by disproportionation of $Yb^{2+}$, to Yb.

From CV, there was evidence that lanthanides mediate $CO_2$ reduction. There was evidence for an irreversible chemical step ($C_i$) during oxidative sweep, catalytic reaction during potential cycling and, possibly a preceding reaction (CE) during oxidative sweep in the presence of $CO_2$ and lanthanides. Also, $Yb^0$ mediate $CO_2$ reduction and not $Yb^{2+}$ or $Yb^+$. From three different $Ln(OTf)_3$ complexes with different number of unpaired electrons, $Yb^0$, the lanthanides with no unpaired electrons had the was least effective at $CO_2$ mediation. Magnetic field effects had a significant impact on $CO_2$ reduction in the presence of lanthanides.

Lanthanides also had a significant effect on oxidation and reduction of other C-1 substrates. The C-1 compound with the least impact from lanthanide triflate was formaldehyde. Most significant effect on C-1 compound electrochemistry was seen in methanol oxidation. From the studies, Nafion modified electrodes in acetonitrile with lanthanide triflate provides not only electrochemical access to lanthanides, but has application in electrocatalysis.

Additional background and data are provided in U.S. priority provisional application 62/403,992, including the twenty pages of Appendix A therein, and incorporated herein by reference.

The following 21 embodiments were described in priority U.S. provisional application Ser. No. 62/403,992 filed Oct. 4, 2016:

Embodiment 1

An electrochemical device, wherein the device comprises at least one cathode, and at least one anode, and at least one electrolyte between the cathode and the anode, wherein the device in operation is adapted for reduction of carbon dioxide or reaction of HCOOH, HCHO, $CH_3OH$, or CO, and wherein the cathode and/or the anode is magnetically modified, or the electrolyte comprises at least one lanthanide and/or actinide compound, or both, wherein the carbon dioxide reduction is enhanced by the cathode and/or anode modification or by the electrolyte comprising at least one lanthanide and/or actinide compound.

Embodiment 2

The electrochemical device of embodiment 1, wherein the device in operation is adapted for reduction of carbon dioxide.

Embodiment 3

The electrochemical device of embodiment 1, wherein the device in operation is adapted for reaction of HCOOH.

Embodiment 4

The electrochemical device of embodiment 1, wherein the device in operation is adapted for reaction of HCHO.

Embodiment 5

The electrochemical device of embodiment 1, wherein the device in operation is adapted for reaction of $CH_3OH$.

Embodiment 6

The electrochemical device of embodiment 1, wherein the device in operation is adapted for reaction of CO.

Embodiment 7

The electrochemical device of embodiment 1, wherein the cathode is magnetically modified, but the electrolyte does not comprise at least one lanthanide and/or actinide compound.

Embodiment 8

The electrochemical device of embodiment 1, wherein the cathode and anode are not magnetically modified, but the electrolyte does comprise at least one lanthanide and/or actinide compound.

Embodiment 9

The electrochemical device of embodiment 1, wherein the cathode and/or anode is magnetically modified, and the electrolyte does comprise at least one lanthanide and/or actinide compound.

Embodiment 10

The electrochemical device of embodiment 1, wherein the cathode and/or anode is magnetically modified, and the electrolyte comprises at least one lanthanide compound, or both.

Embodiment 11

The electrochemical device of embodiment 1, wherein the cathode and anode are not magnetically modified, but the electrolyte does comprise at least one lanthanide compound.

Embodiment 12

The electrochemical device of embodiment 1, wherein the cathode and/or anode is magnetically modified with use of a ionically conducting or ionically permeable film comprising a magnetic material.

Embodiment 13

The electrochemical device of embodiment 1, wherein the cathode and/or anode is magnetically modified with use of a film comprising magnetic particles.

Embodiment 14

The electrochemical device of embodiment 1, wherein the cathode and/or anode is magnetically modified with use of a film comprising magnetic particles and a fluorosulfonic acid polymer.

Embodiment 15

The electrochemical device of embodiment 1, wherein the at least one lanthanide and/or actinide compound comprises trifluoromethanesulfonate.

Embodiment 16

A method comprising reducing carbon dioxide or reacting HCOOH, HCHO, CH$_3$OH, or CO with use of the device of embodiment 1.

Embodiment 17

The method of embodiment 16, wherein the method comprises reducing carbon dioxide.

Embodiment 18

The method of embodiment 16, wherein the method comprises reacting HCOOH.

Embodiment 19

The method of embodiment 16, wherein the method comprises reacting HCHO.

Embodiment 20

The method of embodiment 16, wherein the method comprises reacting CH$_3$OH.

Embodiment 21

The method of embodiment 16, wherein the method comprises reacting CO.

REFERENCES

Naumov, A. V. *Russian Journal of Non-Ferrous Metals* 2008, 49, 14-22 (applications of lanthanides).

Nilsson, M.; Ekberg, C.; Foreman, M.; Hudson, M.; Liljenzin, J. O.; Modolo, G.; Skarnemark, G. *Solvent Extraction and Ion Exchange* 2006, 24, 823-843 (lanthanides produced as non-radioactive decay products).

Lessing, P. A.; Erickson, A. W. *Journal of the European Ceramic Society* 2003, 23, 3049-3057 (lanthanides are neutron absorbers).

Aughterson, R. D.; Lumpkin, G. R.; Smith, K. L.; Thorogood, G. J.; Whittle, K. R. *Scientific Basis for Nuclear Waste Management* Xxxi 2008, 1107, 365-370 (lanthanides are neutron absorbers).

Binnemans, K. *Chemical Reviews* 2007, 107, 2592-2614 (lanthanide electrochemistry, ionic liquids).

Mudring, A. V.; Tang, S. F. *European Journal of Inorganic Chemistry* 2010, 2569-2581 (lanthanide electrochemistry, ionic liquids).

Zhao, H.; Xia, S. Q.; Ma, P. S. *Journal of Chemical Technology and Biotechnology* 2005, 80, 1089-1096 (lanthanide electrochemistry, ionic liquids).

Chamelot, P.; Massot, L.; Hamel, C.; Nourry, C.; Taxil, P. *Journal of Nuclear Materials* 2007, 360, 64-74 (lanthanide electrochemistry, molten salts).

Kuznetsov, S. A.; Hayashi, H.; Minato, K.; Gaune-Escard, M. *Electrochimica Acta* 2006, 51, 2463-2470 (lanthanide electrochemistry, molten salts).

Yamagata, M.; Katayama, Y.; Miura, T. *Journal of the Electrochemical Society* 2006, 153, E5-E9 (lanthanide electrochemistry, molten salts).

Gibilaro, M.; Massot, L.; Chamelot, R.; Taxil, P. *Electrochimica Acta* 2009, 54, 5300-5306 (lanthanide electrochemistry, molten salts).

Nash, K. L.; Jensen, M. P. *Separation Science and Technology* 2001, 36, 1257-1282 (lanthanides, solvent extraction).

Cotton, S. *Lanthanide and Actinide Chemistry*; John Wiley and Sons, Ltd 2007 (lanthanides difficult to separate).

Jitaru, M. *Journal of the University of Chemical Technology and Metallurgy* 2007, 42, 333-344 (convert carbon dioxide to useful products).

Jitaru, M.; Lowy, D. A.; Toma, M.; Toma, B. C.; Oniciu, L. *Journal of Applied Electrochemistry* 1997, 27, 875-889 (hydrogen evolution reaction can dominate under aqueous conditions).

Nonaka, H.; Matsumura, Y. Journal of *Electroanalytical Chemistry* 2002, 520, 101-110 (single carbon species, practical, low temperature electrochemical energy systems).

Hori, Y.; Murata, A.; Takahashi, R.; Suzuki, S. *Journal of the American Chemical Society* 1987, 109, 5022-5023 (C-1 compound electrochemistry in acidic and basic solutions).

Yahikozawa, K.; Fujii, Y.; Matsuda, Y.; Nishimura, K.; Takasu, Y. *Electrochimica Acta* 1991, 36, 973-978 (C-1 compound electrochemistry in acidic and basic solutions).

Park, S.; Xie, Y.; Weaver, M. J. *Langmuir* 2002, 18, 5792-5798 (C-1 compound electrochemistry in acidic and basic solutions).

Cao, P. G.; Zhong, Q. L.; Sun, Y. H.; Gu, R. N. *Chemical Physics Letters* 2003, 376, 806-811 (C-1 compound electrochemistry in nonaqueous medium).

Baldauf, M.; Kolb, D. M. *Journal of Physical Chemistry* 1996, 100, 11375-11381 (C-1 compound electrochemistry in nonaqueous medium).

Gao, P.; Chang, S. C.; Zhou, Z. H.; Weaver, M. J. *Journal of Electroanalytical Chemistry* 1989, 272, 161-178 (C-1 compound electrochemistry in nonaqueous medium).

What is claimed is:

1. A method comprising reducing carbon dioxide or reacting HCOOH, HCHO, CH$_3$OH, and/or CO with use of an electrochemical device, wherein the device comprises at least one cathode, and at least one anode, and at least one electrolyte between the cathode and the anode, wherein the electrolyte comprises at least one lanthanide and/or actinide and, wherein the at least one lanthanide and/or actinide comprises a fluorosulfonate.

2. The method of claim 1, wherein the method comprises the reducing carbon dioxide with use of the electrochemical device.

3. The method of claim 1, wherein the method comprises the reacting HCOOH, HCHO, CH$_3$OH, and/or CO with use of the electrochemical device.

4. The method of claim 1, wherein the electrolyte comprises the at least one lanthanide.

5. The method of claim 1, wherein the electrolyte comprises the at least one actinide.

6. The method of claim 1, wherein the electrolyte comprises the at least one lanthanide and the at least one actinide.

7. The method of claim 1, wherein the at least one lanthanide and/or actinide comprises trifluoromethanesulfonate.

8. The method of claim 1, wherein the cathode and/or anode is modified with a polymeric film.

9. The method of claim 1, wherein the cathode and/or anode is modified with an ionically conducting or ionically permeable film, optionally comprising a magnetic material.

10. The method of claim 1, wherein the cathode and anode are not magnetically modified.

11. The method of claim 1, wherein the cathode and/or anode is magnetically modified.

12. The method of claim 1, wherein the cathode and/or anode is magnetically modified with a film comprising magnetic particles.

13. The method of claim 1, wherein the cathode and/or anode is magnetically modified with a film comprising magnetic particles and a fluorosulfonic acid polymer.

14. The method of claim 1, wherein the electrolyte is dissolved in a solvent system comprising a solvent which has a dielectric constant of at least 5 as primary solvent.

15. The method of claim 1, wherein the electrolyte is dissolved in a solvent system comprising acetonitrile as primary solvent.

16. The method of claim 1, wherein the device is part of a fuel cell, a battery, an electrosynthetic device, or an electrolyzer.

17. A method comprising reducing carbon dioxide or reacting HCOOH, HCHO, CH$_3$OH, and/or CO with use of an electrochemical device, wherein the device comprises at least one cathode, and at least one anode, and at least one electrolyte between the cathode and the anode, wherein the electrolyte comprises at least one lanthanide and/or actinide and, wherein the cathode and/or anode is modified with an ionically conducting or ionically permeable film, optionally comprising a magnetic material.

18. The method of claim 17, wherein the cathode and/or anode is modified with the ionically conducting or ionically permeable film comprising the magnetic material.

* * * * *